(12) United States Patent
Chen et al.

(10) Patent No.: US 12,703,133 B2
(45) Date of Patent: Aug. 11, 2026

(54) INJECTION MOLDING SYSTEM AND METHOD

(71) Applicant: KING STEEL MACHINERY CO., LTD., Taichung City (TW)

(72) Inventors: Ching-Hao Chen, Taichung City (TW); Yi-Chung Lee, Taichung City (TW)

(73) Assignee: KING STEEL MACHINERY CO., LTD., Taichung City (TW)

( * ) Notice: Subject to any disclaimer, the term of this patent is extended or adjusted under 35 U.S.C. 154(b) by 131 days.

(21) Appl. No.: 18/542,758

(22) Filed: Dec. 17, 2023

(65) Prior Publication Data

US 2024/0316841 A1 Sep. 26, 2024

Related U.S. Application Data

(60) Provisional application No. 63/491,529, filed on Mar. 21, 2023.

(51) Int. Cl.
*B29C 45/06* (2006.01)
*B29C 45/13* (2006.01)
*B29C 45/16* (2006.01)

(52) U.S. Cl.
CPC .............. *B29C 45/06* (2013.01); *B29C 45/13* (2013.01); *B29C 45/162* (2013.01)

(58) Field of Classification Search
CPC ....... B29C 45/045; B29C 45/06; B29C 45/13; B29C 45/162; B29C 45/1628
See application file for complete search history.

(56) References Cited

U.S. PATENT DOCUMENTS 6,709,251 B2 * 3/2004 Payette ............... B29C 45/1628 425/576
6,719,551 B2 * 4/2004 Polk, Jr. .................. B29C 48/07 425/297

(Continued)

FOREIGN PATENT DOCUMENTS

CN 1289715 A 4/2001
CN 104786420 A 7/2015

(Continued)

OTHER PUBLICATIONS

Office Action issued by Taiwan Intellectual Property Office dated Dec. 3, 2024 for Taiwan Application No. 113109328.

(Continued)

*Primary Examiner* — Thu Khanh T. Nguyen
(74) *Attorney, Agent, or Firm* — WPAT LAW; Anthony King

(57) ABSTRACT

An injection molding system is provided. The injection molding system includes a first carrier, a first injector, a second carrier, a second injector, and a bridging mechanism. The first carrier is configured to hold a first mold. The first injector is disposed over the first carrier and configured to inject a first polymeric material. The second carrier is configured to hold a second mold. The second injector is disposed over the second carrier and configured to inject a second polymeric material. The bridging mechanism is disposed between and rotatable relative to the first carrier and the second carrier. The bridging mechanism is configured to receive a third mold from the first carrier or the second carrier and convey the third mold between the first carrier and the second carrier.

19 Claims, 25 Drawing Sheets

(56) References Cited

U.S. PATENT DOCUMENTS

| | | | |
|---|---|---|---|
| 2009/0218726 | A1 | 9/2009 | Sieverding et al. |
| 2012/0086141 | A1 | 4/2012 | Jung et al. |
| 2014/0077410 | A1* | 3/2014 | Takatsugi .............. B29C 45/162 264/161 |
| 2021/0402661 | A1 | 12/2021 | Yeh et al. |

FOREIGN PATENT DOCUMENTS

| | | | |
|---|---|---|---|
| CN | 106808675 | A | 6/2017 |
| CN | 107825639 | A | 3/2018 |
| CN | 207190085 | U | 4/2018 |
| CN | 114347358 | A | 4/2022 |
| JP | H08192429 | A | 7/1996 |
| JP | 2013-132831 | A | 7/2013 |
| JP | 2021049689 | A | 4/2021 |
| JP | 2021146732 | A | 9/2021 |
| JP | 2022008058 | A | 1/2022 |
| TW | 200633840 | A | 10/2006 |
| TW | 201213087 | A | 4/2012 |
| TW | 201941895 | A | 11/2019 |
| WO | 2020100920 | A1 | 5/2020 |

OTHER PUBLICATIONS

U.S. Pat. No. 5,723,154A is the US counterpart of CN 1289715A.
U.S. Pat. No. 7,790,089B2 is the US counterpart of TW 200633840A.
English Translation of Abstract of CN114347358A.
English Translation of Abstract of TW201213087A.
Office Action issued by Japan Patent Office dated Mar. 25, 2025 for JP P2024-024814.
U.S. Pat. No. 12,049,032B2 is the US counterpart of JP 2021146732A.
U.S. Pat. No. 5,723,154A is the US counterpart of JP H08192429A.
English Translation of Abstract of JP 2021049689A.
U.S. Pat. No. 12,186,954B2 is the US counterpart of JP 2022008058A.
US 20210394408A1 is the US counterpart of WO 2020100920A1.

* cited by examiner

INJECTION MOLDING SYSTEM AND METHOD

CROSS-REFERENCE TO RELATED APPLICATION

The present application claims priority to U.S. Provisional Patent Application No. 63/491,529, filed on Mar. 21, 2023, which is incorporated by reference herein in its entirety.

TECHNICAL FIELD

The present invention is related to an injection molding system and an injection molding method, and, in particular, to an injection molding system and a method of injection molding for forming an article including more than one portion having different physical or functional properties.

BACKGROUND

Foamed polymeric material has many advantages, such as high strength, low weight, impact resistance, thermal insulation, and others. Foamed articles can be made by injection molding or extrusion molding. For example, after the polymeric material is melted and mixed with a blowing agent to form a mixture, a force or pressure is applied to the mixture to inject or extrude the mixture into a cavity of a mold, and the mixture is foamed and cooled in the cavity to form the foamed article.

However, it is necessary to improve the properties of the foamed article made by the injection molding system, such as causing different portions of the foamed article to have different properties. Therefore, there is a need for improvements to structures of the injection-molding system and the method for making foamed articles.

BRIEF SUMMARY OF THE INVENTION

One purpose of the present invention is to provide an injection molding system and an injection molding method.

According to one embodiment of the present disclosure, an injection molding system is provided. The injection molding system includes a first carrier configured to hold a first mold; a first injector disposed over the first carrier and configured to inject a first polymeric material; a second carrier configured to hold a second mold; a second injector disposed over the second carrier and configured to inject a second polymeric material; and a bridging mechanism disposed between and moveable relative to the first carrier and the second carrier. The bridging mechanism is configured to receive a third mold from the first carrier or the second carrier and convey the third mold between the first carrier and the second carrier.

According to one embodiment of the present disclosure, an injection molding method is provided. The injection molding method includes: providing an injection molding system including a first carrier, a second carrier disposed adjacent to the first carrier, a bridging mechanism between the first carrier and the second carrier, a first injector over the first carrier, a second injector over the second carrier, a first mold held on the first carrier, and a second mold held on the second carrier; engaging a third mold with the first mold to form a first mold cavity; injecting a first polymeric material into the first mold cavity by the first injector; moving the third mold carrying the first polymeric material to the bridging mechanism; conveying the third mold to the second carrier by the bridging mechanism; engaging the third mold with the second mold to form a second mold cavity; injecting a second polymeric material into the second mold cavity by the second injector; and obtaining an article including the first polymeric material and the second polymeric material.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
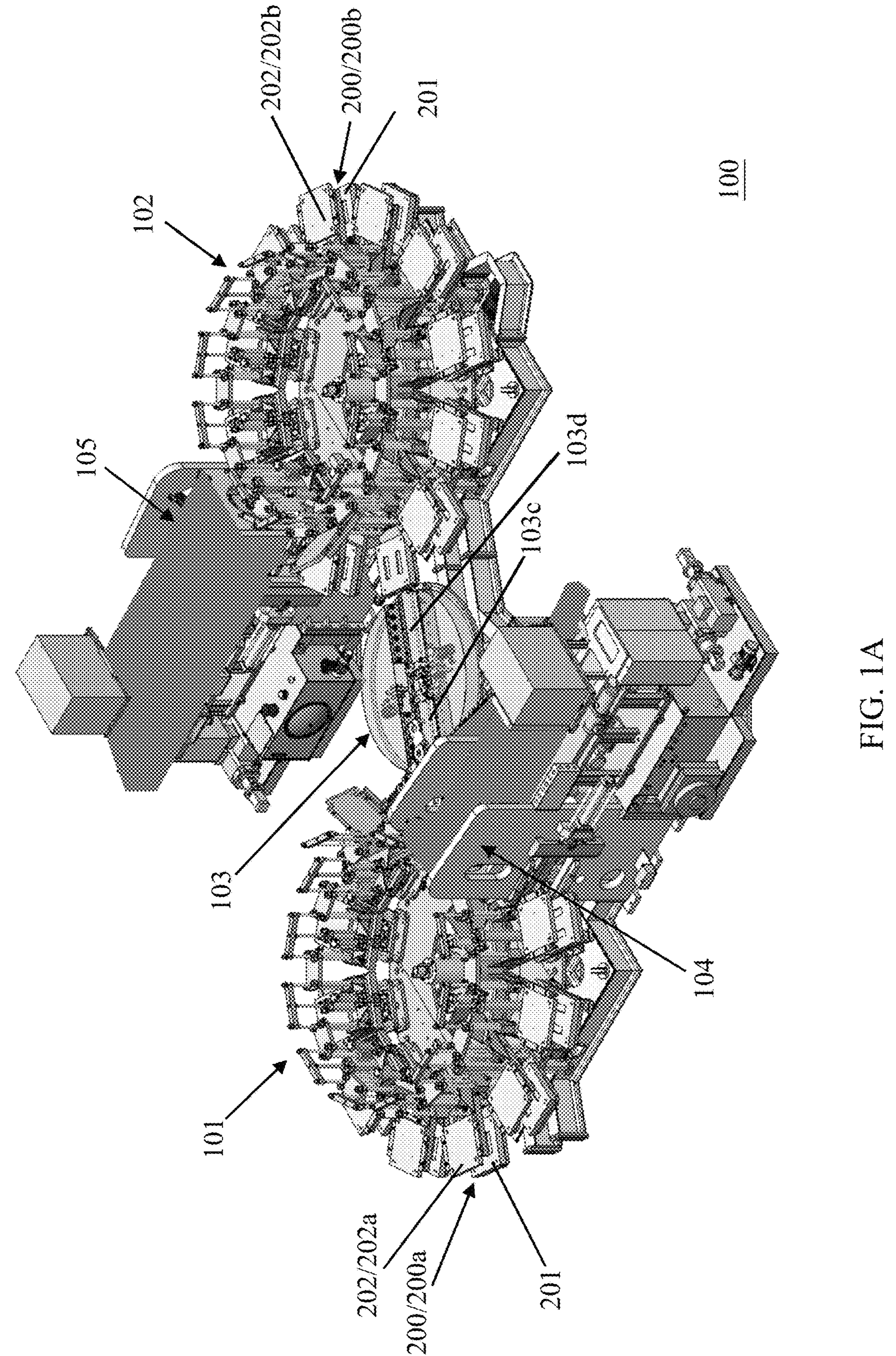
FIG. 1A is a schematic perspective view of an injection molding system in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term “about” generally means within 10%, 5%, 1%, or 0.5% of a given value or range. Alternatively, the term “about” means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term “about.” Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 1B:
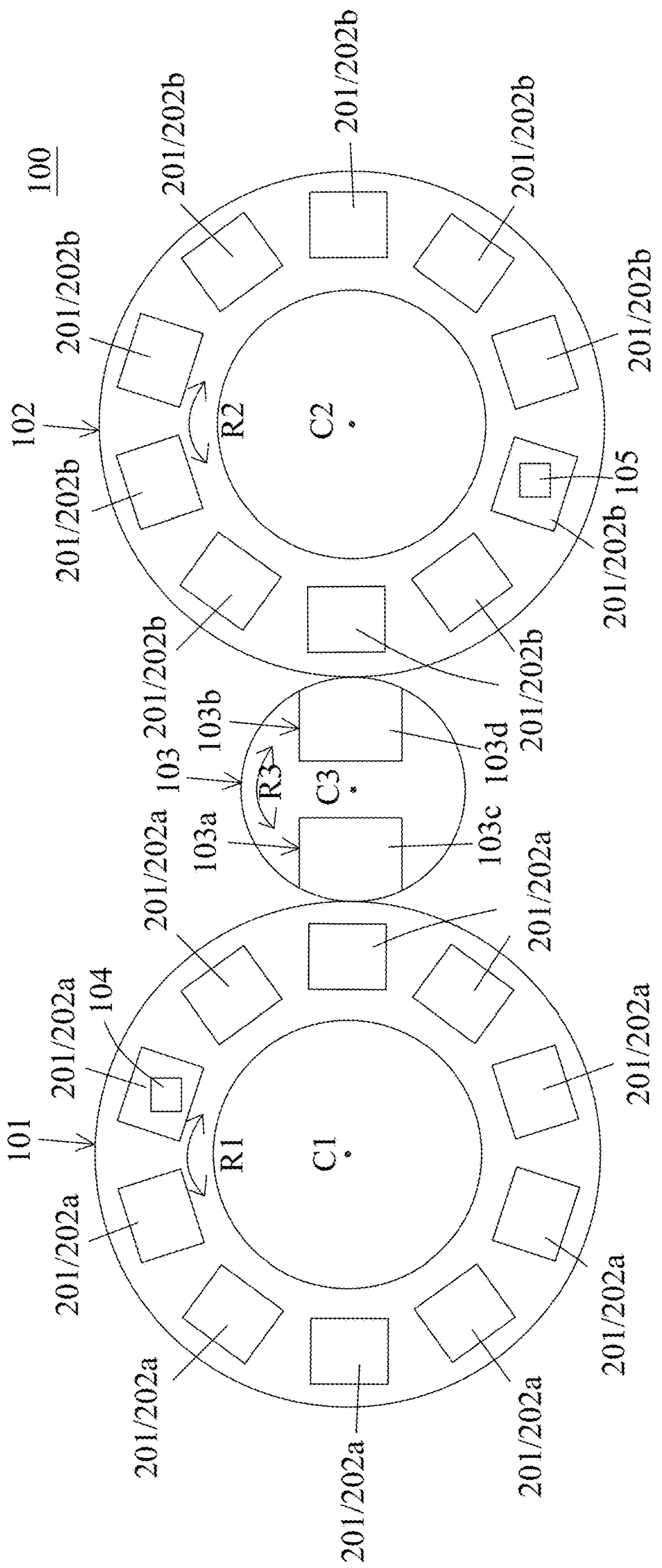
FIG. 1B is a schematic top view of the injection molding system of FIG. 1A in accordance with some embodiments of the present disclosure.

FIG. 1A is a schematic perspective view of an injection molding system 100 in accordance with some embodiments of the present disclosure, and FIG. 1B is a schematic top view of the injection molding system 100 of FIG. 1A. The injection molding system 100 includes a first carrier 101 and a second carrier 102 disposed adjacent to the first carrier 101.

In some embodiments, the first carrier 101 is rotatable about a first center C1 and along a first direction R1, and the second carrier 102 is rotatable about a second center C2 and along a second direction R2. In some embodiments, the first carrier 101 and the second carrier 102 are in an annular shape. In some embodiments, the first carrier 101 and the second carrier 102 are turntables. In some embodiments, the first carrier 101 is rotatable in a direction same as the second carrier 102. For example, both the first carrier 101 and the second carrier 102 are rotatable in anti-clockwise direction. In some embodiments, the first carrier 101 is rotatable in a direction opposite to the second carrier 102. For example, the first carrier 101 is rotatable in anti-clockwise direction, and the second carrier 102 is rotatable in clockwise direction, or vice versa. In some embodiments, the first carrier 101 and the second carrier 102 are operated and controlled automatically. In some embodiments, the first carrier 101 and the second carrier 102 communicable with each other through any suitable communication protocol such as programmable logic control (PLC) protocol or the like.

In some embodiments, multiple molding stations 200 are configured on the first carrier 101 and the second carrier 102. Each molding station 200 includes a lower mold 201 and an upper mold 202 disposed above the lower mold 201. In the embodiment of the injection molding system 100, the molding stations 200 configured on the first carrier 101 are referred as the first molding stations 200*a*, and the molding stations 200 configured on the second carrier 102 are referred as the second molding stations 200*b*.

Figure 2:
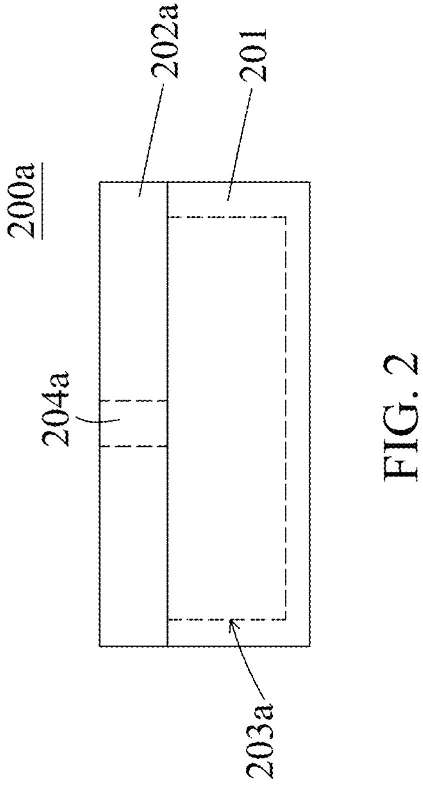
FIG. 2 is a schematic cross-sectional view of the first molding station in a closed configuration in accordance with some embodiments of the present disclosure.

FIG. 2 is a schematic cross-sectional view of the first molding station 200*a* in a closed configuration in accordance with some embodiments of the present disclosure. In FIG. 2, the first molding station 200*a* includes a lower mold 201 and a first upper mold 202*a*. In some embodiments, the first upper mold 202*a* corresponds to the lower mold 201 in some configurations such as dimension, shape or the like. The first upper mold 202*a* can be placed on and engaged with the lower mold 201. In some embodiments, a first mold cavity 203*a* is defined by the first upper mold 202*a* and the lower mold 201 when the first molding station 200*a* is in the closed configuration. Although FIG. 2 illustrates only one first mold cavity 203*a* in the closed configuration, it can be understood that any suitable numbers of the first mold cavity 203*a* can be configured in the closed configuration.

In some embodiments, a first sprue 204*a* is configured at the first upper mold 202*a*. The first sprue 204*a* is configured to extend through the first upper mold 202*a*, and is communicable with the first mold cavity 203*a* when the first molding station 200*a* is in the closed configuration. For simplicity and clarity, only one first sprue 204*a* is illustrated, however, it can be understood that any suitable numbers of the first sprue 204*a* can be configured at the first upper mold 202*a*.

In some embodiments, a removable plate (not shown) can be placed between the first upper mold 202*a* and the lower mold 201 for adjusting a volume of the first mold cavity 203*a*. For example, the first mold cavity 203*a* would be reduced if the removable plate is inserted into the first mold cavity 203*a* and disposed between the first upper mold 202*a* and the lower mold 201. As such, the volume of the first mold cavity 203*a* can be adjusted by insertion of the removable plate between the first upper mold 202*a* and the lower mold 201 when the first molding station 200*a* is closed.

Figure 3:
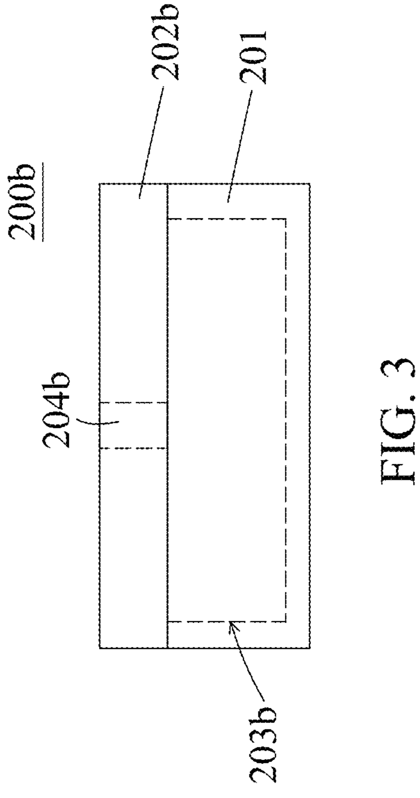
FIG. 3 is a schematic cross-sectional view of the second molding station in a closed configuration in accordance with some embodiments of the present disclosure.

FIG. 3 is a schematic cross-sectional view of the second molding station 200*b* in a closed configuration in accordance with some embodiments of the present disclosure. In FIG. 3, the second molding station 200*b* includes the lower mold 201 and a second upper mold 202*b*. In some embodiments, the second upper mold 202*b* corresponds to the lower mold 201 in some configurations such as dimension, shape or the like. The second upper mold 202*b* can be placed on and engaged with the lower mold 201. In some embodiments, a second mold cavity 203*b* is defined by the second upper mold 202*b* and the lower mold 201 when the second molding station 200*b* is in the closed configuration.

In some embodiments, a second sprue 204*b* is configured at the second upper mold 202*b*. The second sprue 204*b* is configured to extend through the second upper mold 202*b*, and is communicable with the second mold cavity 203*b* when the second molding station 200*b* is in the closed configuration. In some embodiments, a removable plate (not shown) can be placed between the second upper mold 202*b* and the lower mold 201 for adjusting a volume of the second mold cavity 203*b*.

In some embodiments, each of the first carrier 101 and the second carrier 102 includes multiple holders (not shown) for holding the first upper molds 202*a* or the second upper molds 202*b*. In some embodiments, the first upper mold 202*a* of FIG. 2 and the second upper mold 202*b* of FIG. 3 have different configurations. In some embodiments, the lower molds 201 of the first molding stations 200*a* in FIG. 2 and the lower molds 201 of the second molding stations 200*b* in FIG. 3 have the same configurations.

Referring back to FIGS. 1A and 1B together, the injection molding system 100 further includes a first injector 104 adjacent to the first carrier 101 and a second injector 105 adjacent to the second carrier 102. The first injector 104 is disposed over one of the first molding stations 200*a* and configured to discharge a first polymeric material M1 into the first mold cavity 203*a* defined by the corresponding lower mold 201 and the corresponding first upper mold 202*a* of the one of the first molding stations 200*a*. Similarly, the second injector 105 is disposed over one of the second molding stations 200*b* and configured to discharge a second polymeric material M2 into the second mold cavity 203*b* defined by the corresponding lower mold 201 and the corresponding second upper mold 202*b* of the one of the second molding stations 200*b*. In some embodiments, the first polymeric material M1 can be flowed from the first injector 104 into the first mold cavity 203*a* through the first sprue 204*a*, and the second polymeric material M2 can be flowed from the second injector 105 into the second mold cavity 203*b* through the second sprue 204*b*.

In some embodiments, the first injector 104 is coupled to a first mixing unit (not shown) that is configured to mix a polymeric material with a blowing agent to produce the first polymeric material and convey the first polymeric material to the first injector 104. In some embodiments, similarly, the second injector 105 is coupled to a second mixing unit (not shown) that is configured to mix a polymeric material with a blowing agent to produce the second polymeric material and convey the second polymeric material to the second injector 105.

In some embodiments, the first injector 104 is disposed over the first carrier 101. In some embodiments, the holders (not shown) pass under the first injector 104 one by one upon rotation of the first carrier 101. In some embodiments, the first injector 104 is fixedly installed over the first carrier 101. The first carrier 101 is movable relative to the first injector 104, and the first injector 104 is stationary relative to the first carrier 101.

In some embodiments, the second injector 105 is disposed over the second carrier 102. In some embodiments, the holders (not shown) pass under the second carrier 102 one by one upon rotation of the second carrier 102. In some embodiments, the second injector 105 is fixedly installed over the second carrier 102. The second carrier 102 is movable relative to the second injector 105, and the second injector 105 is stationary relative to the second carrier 102.

In some embodiments, the first polymeric material M1 and the second polymeric material M2 have the same or different physical properties (such as density, hardness, Young's modules, etc.). In some embodiments, the first polymeric material M1 and the second polymeric material M2 include thermoplastic polyurethane (TPU), polyurethane (PU), plastics or any other suitable materials. In some embodiments, the first polymeric material and the second polymeric material are foamable materials.

The injection molding system 100 further includes a bridging mechanism 103 disposed between the first carrier 101 and the second carrier 102. The bridging mechanism 103 is rotatable or moveable relative to the first carrier 101 and the second carrier 102. The bridging mechanism 103 is configured to connect the first carrier 101 with the second carrier 102 so as to sequentially convey the lower molds 201 from the first carrier 101 to the second carrier 102 or vice versa.

In some embodiments, the bridging mechanism 103 is in an annular shape. In some embodiments, the bridging mechanism 103 is rotatable about a third center C3 and along a third direction R3. In some embodiments, the bridging mechanism 103 is rotatable in clockwise or anti-clockwise. In some embodiments, the bridging mechanism 103 is removable and detachable from the injection molding system 100. The bridging mechanism 103 is operable independent from the first carrier 101 and the second carrier 102. In some embodiments, the first center C1 of the first carrier 101, the third center C3 of the bridging mechanism 103 and the second center C2 of the second carrier 102 are arranged on a straight line. In other words, the first carrier 101 and the second carrier 102 are disposed at opposite sides of the bridging mechanism 103.

In the embodiment of the injection molding system 100, the bridging mechanism 103 includes two conveying units 103*a* and 103*b*. The conveying units 103*a* and 103*b* are disposed at opposite sides of the bridging mechanism 103. Each of the conveying units 103*a* and 103*b* is configured to convey the lower mold 201 from the first carrier 101 to the bridging mechanism 103 or vice versa, or from the second carrier 102 to the bridging mechanism 103 or vice versa. In some embodiments, each of the conveying units 103*a* and 103*b* is a rail, belt or any other conveying means. In some embodiments, the bridging mechanism 103 may include single or more than two conveying units.

The bridging mechanism 103 further includes two receiving spaces 103*c* and 103*d*. The receiving spaces 103*c* and 103*d* are disposed at opposite sides of the bridging mechanism 103. Each of the receiving spaces 103*c* and 103*d* is configured to receive and temporarily hold the lower mold 201 to be conveyed. In some embodiments, one lower mold 201 can be held within one of the receiving spaces 103*c* and 103*d* during the rotation of the bridging mechanism 103. In some embodiments, during the rotation of the bridging mechanism 103, the two lower mold 201 can be held within the receiving spaces 103*c* and 103*d*, respectively. In some embodiments, the receiving space 103*c* and the conveying unit 103*a* are positioned in close proximity to each other, either set together or placed adjacent to one another, and the receiving space 103*d* and the conveying unit 103*b* are positioned in close proximity to each other.

In some embodiments, the injection molding system 100 further includes an additional processing unit (not shown) that is arranged adjacent to the bridging mechanism 103. In some embodiments, the additional processing unit is configured to treat or process the lower mold 201 when the lower mold 201 is held within the receiving space 103*c* or 103*d*. In some embodiments, the additional processing unit is configured to perform various processes such as inserting a color block into the lower mold 201, trimming a runner or other redundant part from an intermediate article inside the lower mold 201, heating or pre-heating the lower mold 201 and/or the intermediate article inside the lower mold 201, cleaning the lower mold 201, etc. In some embodiments, the additional processing unit includes an injector, a cutter, a heater, a cleaner and so on.

Figure 4:
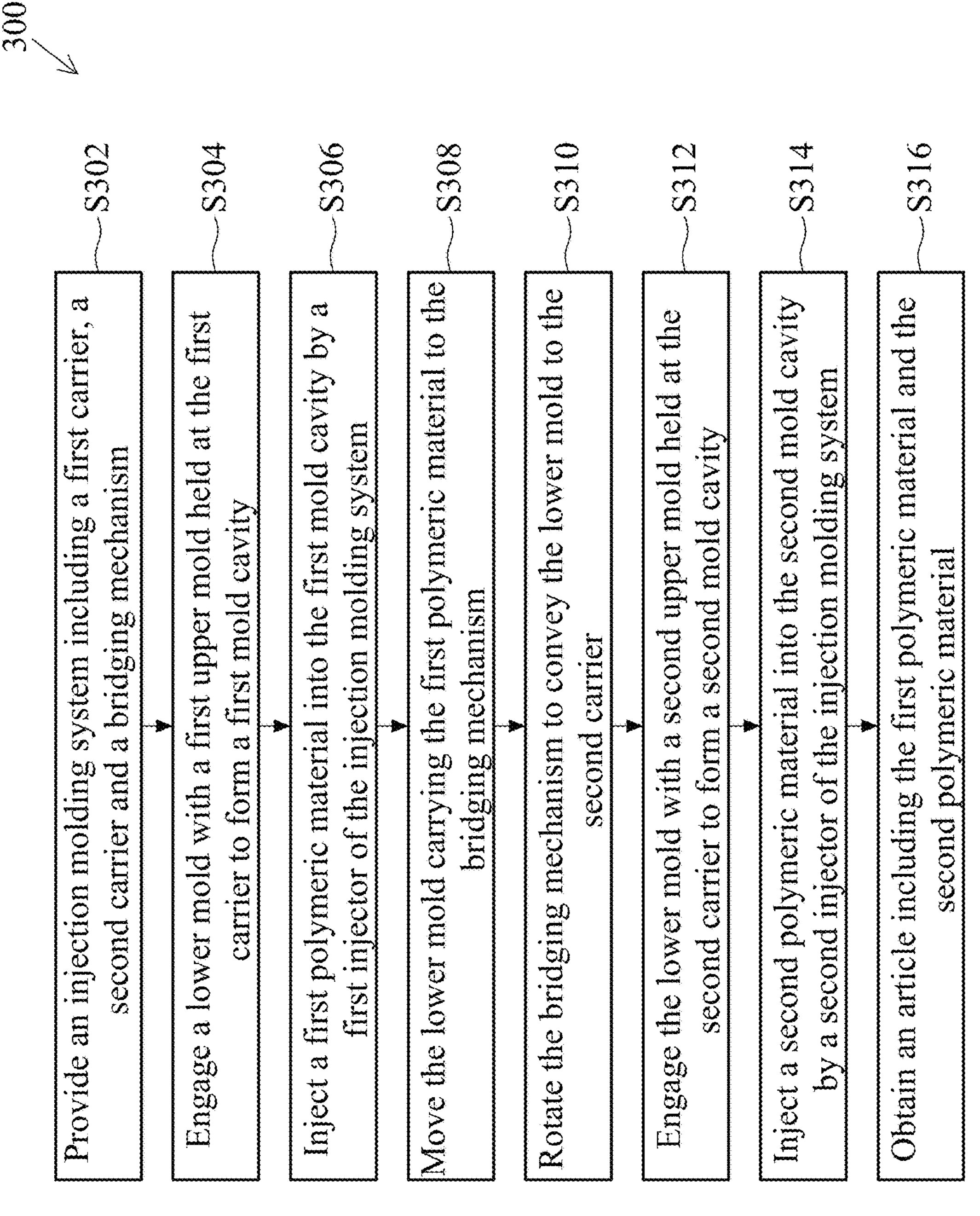
FIG. 4 is a flowchart showing an injection molding method in accordance with some embodiments of the present disclosure.

FIG. 4 is a flowchart showing an injection molding method 300 in accordance with some embodiments of the present disclosure. The injection molding method 300 includes the operations S302 through S316, and the description and illustrations are not deemed as a limitation of the sequence of the operations S302 through S316. FIGS. 5-31 are schematic top or cross-sectional views of various stages of the injection molding method 300. In some embodiments, the operations of the injection molding method 300 can be repeated and performed automatically.

In order to illustrate concepts and the injection molding method 300 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. For ease of illustration, reference numerals with similar or same functions and properties are repeated in different embodiments and figures.

Figure 5:
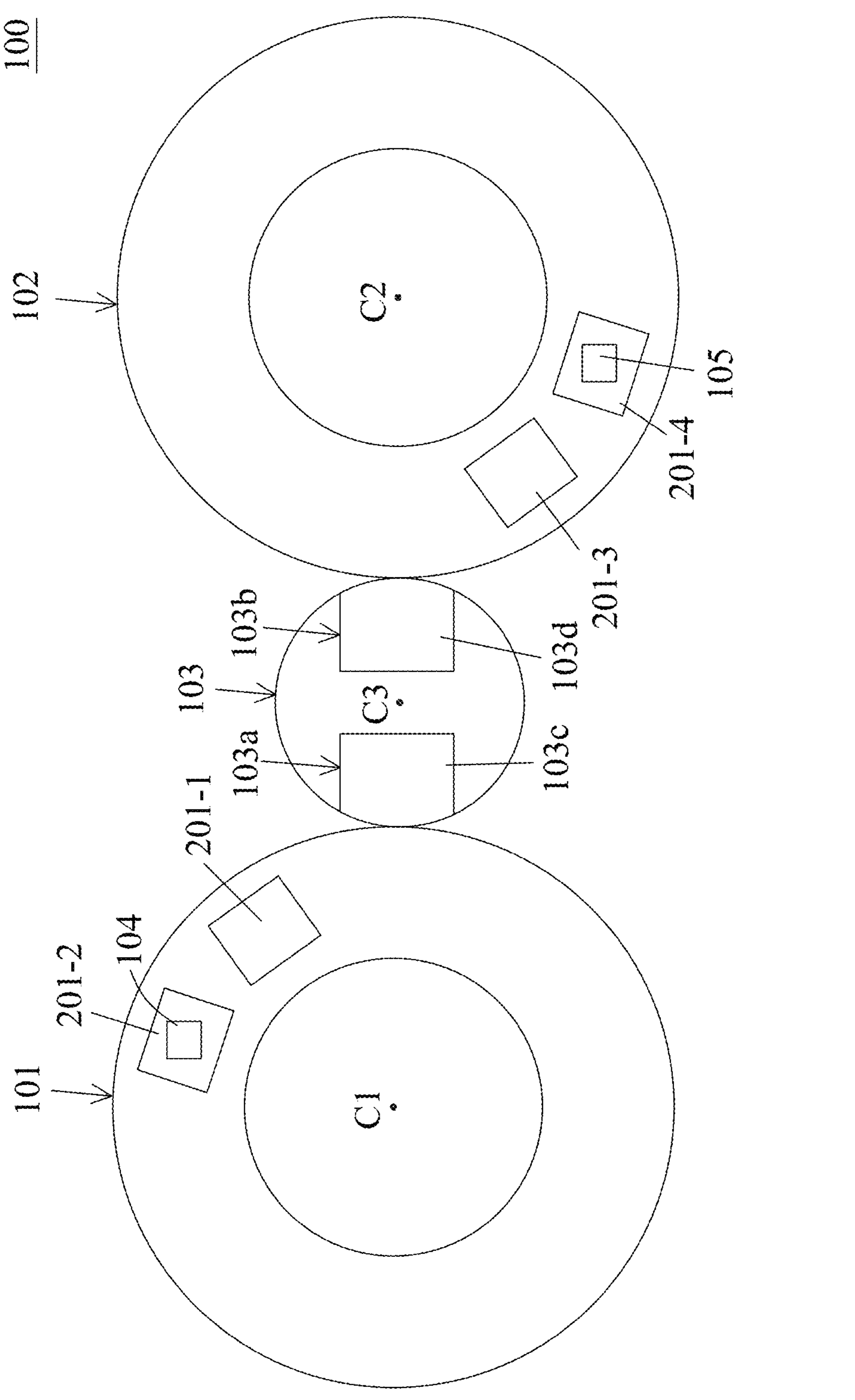
FIG. 5 through FIG. 31 are schematic views illustrating exemplary articles in an injection molding method according to one embodiment of the present disclosure.

First, in the operation S302 of the injection molding method 300, the injection molding system 100 is provided or received, as shown in FIG. 5. The injection molding system 100 of FIG. 5 has same configuration as the one shown in FIGS. 1A and 1B. For simplicity, only two lower molds 201 on the first carrier 101 and two lower molds 201 on the second carrier 102 are shown in FIG. 5. However, it would be understood that each of the lower molds 201 on the first carrier 101 is under the corresponding one of the first upper molds 202*a*, and each of the lower molds 201 on the second carrier 102 is under the corresponding one of the second upper molds 202*b*. Furthermore, it is not intended to limit the number of lower molds 201 on the first carrier 101 and the second carrier 102.

In some embodiments, the first injector 104 is disposed above one of the first molding stations 200*a*, and the second injector 105 is disposed above one of the second molding stations 200*b*. In some embodiments, all of the first upper molds 202*a* are fixedly attached to the first carrier 101, and all of the second upper molds 202*b* are fixedly attached to the second carrier 102.

As shown in FIG. 5, the lower molds 201 on the first carrier 101 are referred to as a first lower mold 201-1 and a second lower mold 201-2, and the lower molds 201 on the second carrier 102 are referred to as a third lower mold 201-3 and a fourth lower mold 201-4. The first injector 104 is disposed above the second lower mold 201-2 and the corresponding one of the first upper molds 202*a*, and the second injector 105 is disposed above the fourth lower mold 201-4 and the corresponding one of the second upper molds 202*b*.

Referring back to FIG. 4, in the operation S304 of the injection molding method 300, the lower mold on the first carrier 101 under the first injector 104 (e.g., the lower mold 201-2 of FIG. 5) is engaged with the corresponding one of the first upper molds 202*a* to form the first mold cavity 203*a*.

Figure 6:
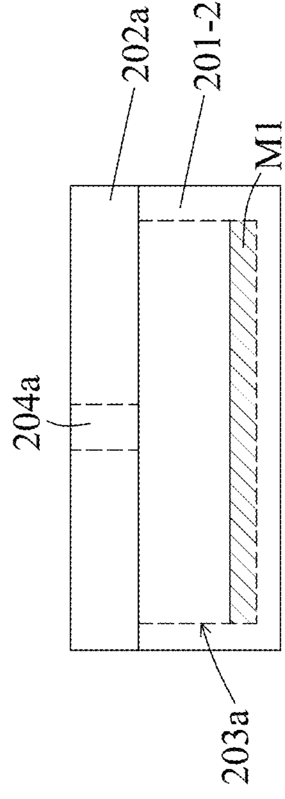

Next, in the operation S306 of the injection molding method 300, the first polymeric material M1 is injected into the first mold cavity by the first injector 104. As shown in FIG. 6, the first polymeric material M1 from the first injector 104 is injected into the first mold cavity 203*a* through the first sprue 204*a*, and the first mold cavity 203*a* is formed by the lower mold 201-2 under the first injector 104 and the corresponding first upper mold 202*a*. In some embodiments, the first polymeric material M1 includes thermoplastic polyurethane (TPU), polyurethane (PU), plastics or any other suitable materials. In some embodiments, the first polymeric material M1 includes a physical blowing agent such as supercritical fluid. In some embodiments, the physical blowing agent is gaseous nitrogen, carbon dioxide, etc. In some embodiments, the first polymeric material M1 is foamable, non-foamable or slightly foamable.

Figure 7:
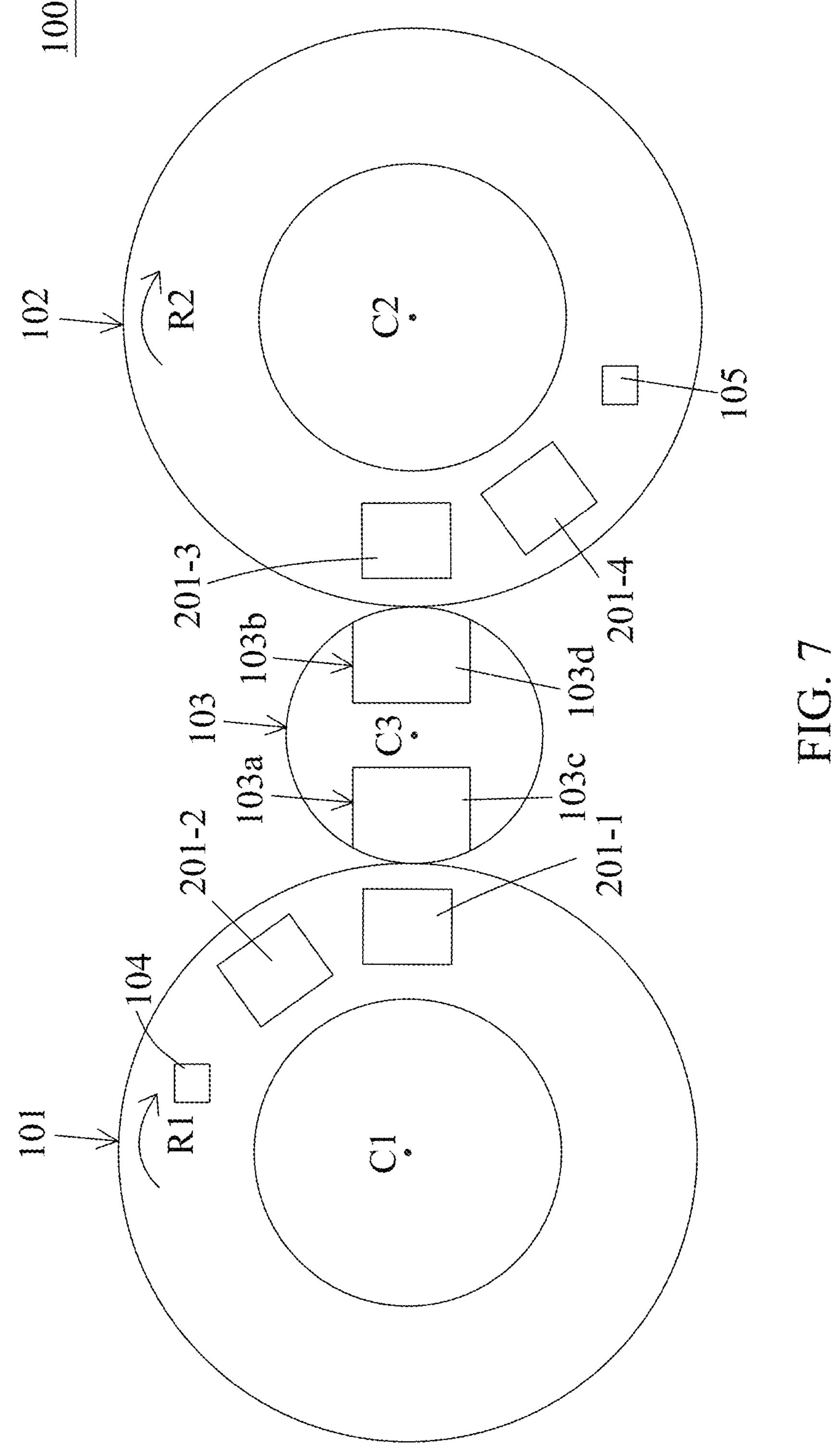
Figure 9:
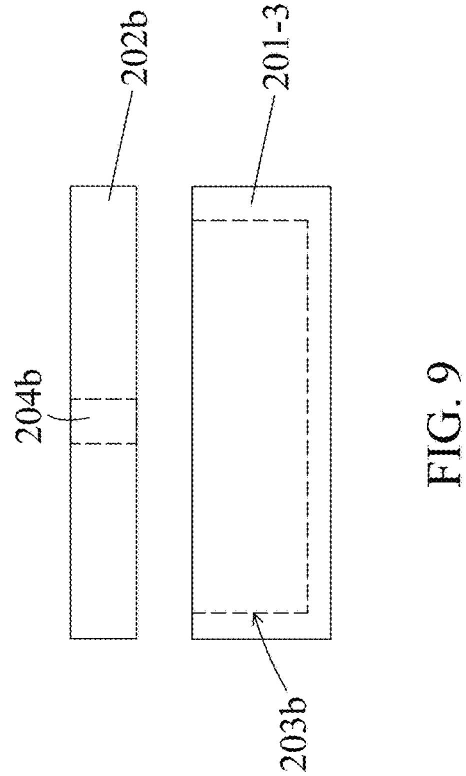

After the first polymeric material M1 is injected, the first carrier 101 and the second carrier 102 are rotated in the first direction R1 and the second direction R2, respectively. FIG. 7 shows the first carrier 101 and the second carrier 102 after the rotation. In some embodiments, the first carrier 101 and the second carrier 102 are rotated at a predetermined interval. In some embodiments, the first carrier 101 and the second carrier 102 are rotated independently or simultaneously. In some embodiments, the first carrier 101 and the second carrier 102 are rotated in different speed or the same speed. In some embodiments, the first direction R1 and the second direction R2 can be same as or different from each other. As shown in FIG. 7, after the rotation, the first lower mold 201-1 and the corresponding one of the first upper molds 202*a* are disposed adjacent to the first receiving space 103*c* of the bridging mechanism 103, and the third lower mold 201-3 and the corresponding one of the second upper molds 202*b* are disposed adjacent to the second receiving space 103*d* of the bridging mechanism 103. In some embodiments, the first lower mold 201-1 is aligned with the first receiving space 103*c*, and the third lower mold 201-3 is aligned with the second receiving space 103*d*.

Figure 8:
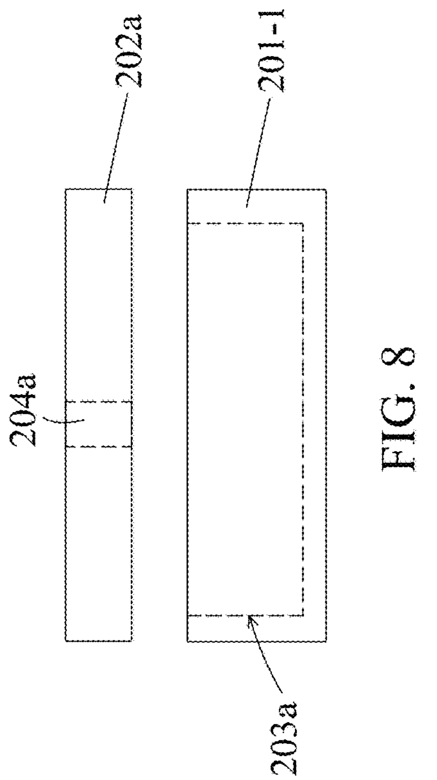

After the rotation of the first carrier 101, the first lower mold 201-1 is disengaged with the corresponding one of the first upper molds 202*a* as shown in FIG. 8. In an open configuration of FIG. 8, no first polymeric material M1 is injected into the first mold cavity 203*a* of the lower mold 201-1. Similarly, after the rotation of the second carrier 102, the third lower mold 201-3 is disengaged with the corresponding one of the second upper molds 202*b* as shown in an open configuration of FIG. 9. That is, the first lower mold 201-1 is movable relative to the first carrier 101, and the third lower mold 201-3 is movable relative to the second carrier 102.

Figure 10:
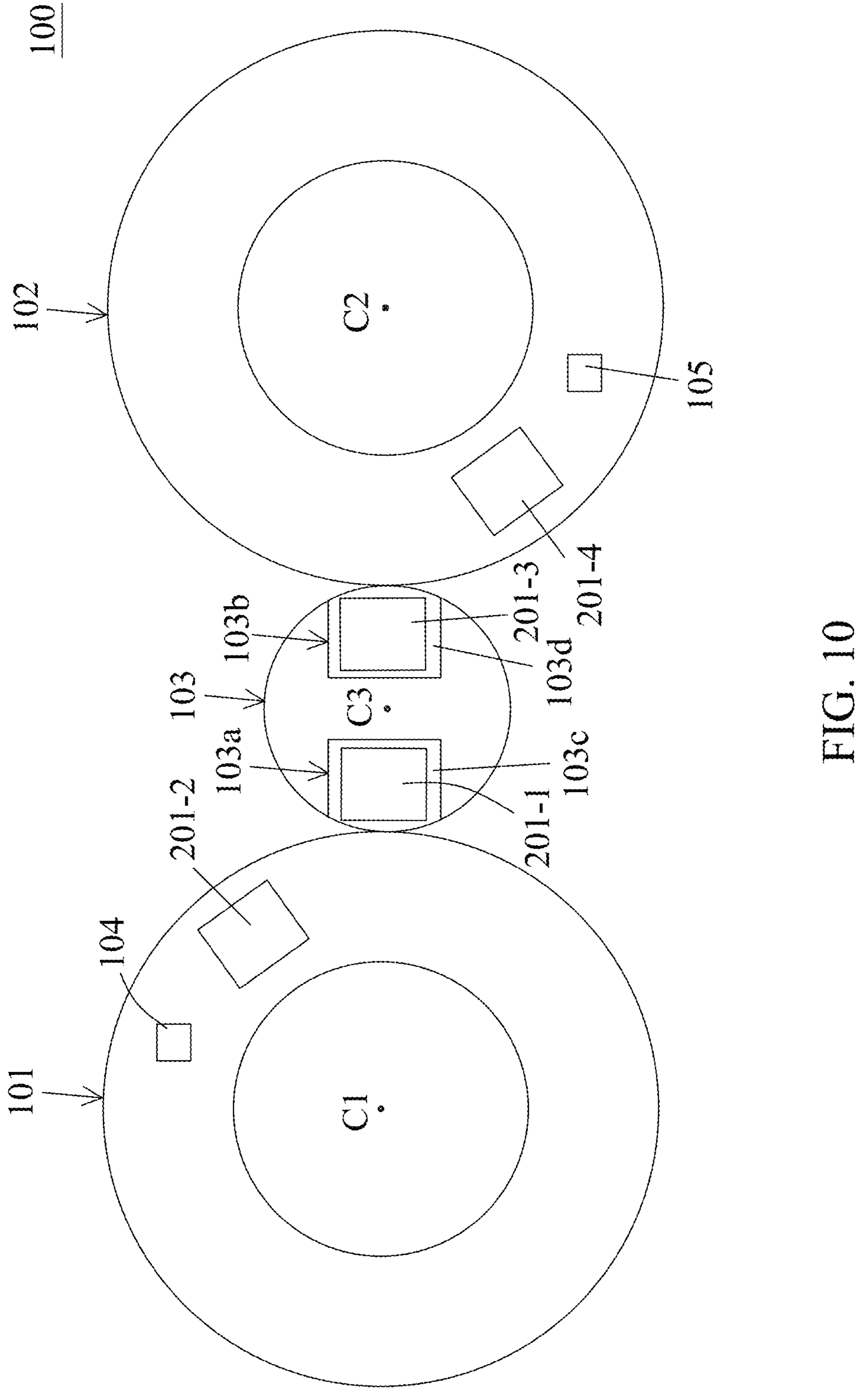

After the first lower mold 201-1 and the third lower mold 201-3 are disengaged, the first lower mold 201-1 is moved from the first carrier 101 into the first receiving space 103*c* of the bridging mechanism 103 by the first conveying unit 103*a*, and the third lower mold 201-3 is moved from the second carrier 102 into the second receiving space 103*d* of the bridging mechanism 103 by the second conveying unit 103*b*, as shown in FIG. 10.

Figure 11:
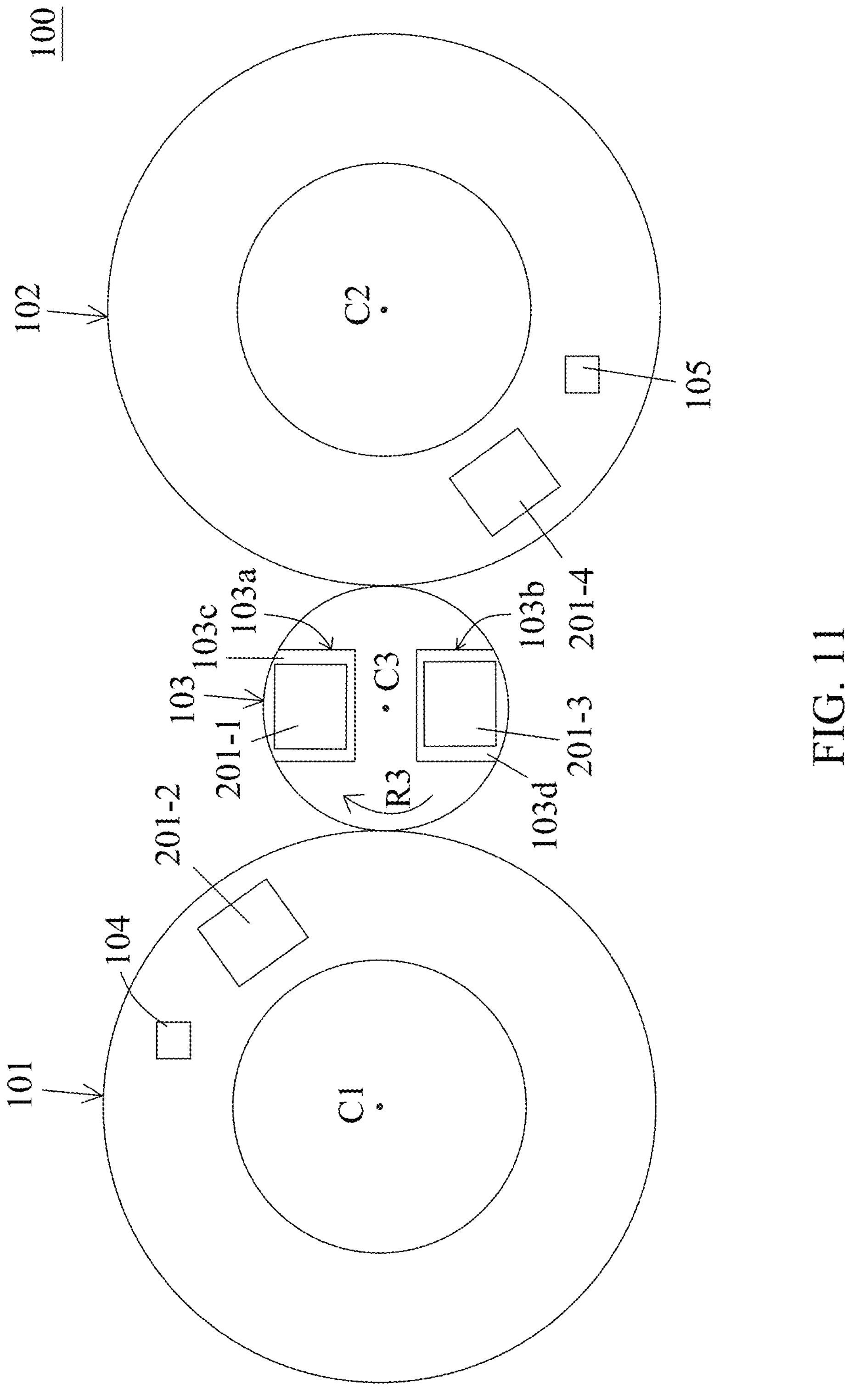

After the first lower mold 201-1 and the third lower mold 201-3 are moved to the bridging mechanism 103, the bridging mechanism 103 is rotated in the third direction R3 to convey the first lower mold 201-1 and the third lower mold 201-3. In some embodiments, the first carrier 101 and the second carrier 102 stop rotation temporarily during the rotation of the bridging mechanism 103. In some embodiments, the bridging mechanism 103 is rotated in a predetermined angle as shown in FIG. 11 so that the first lower mold 201-1 is away from the first carrier 101 and the third lower mold 201-3 is away from the second carrier 102. After the rotation in the predetermined angle, the first lower mold 201-1 and the third lower mold 201-3 are processed by one or more additional processing units (not shown) configured at or over the bridging mechanism 103.

Figure 12:
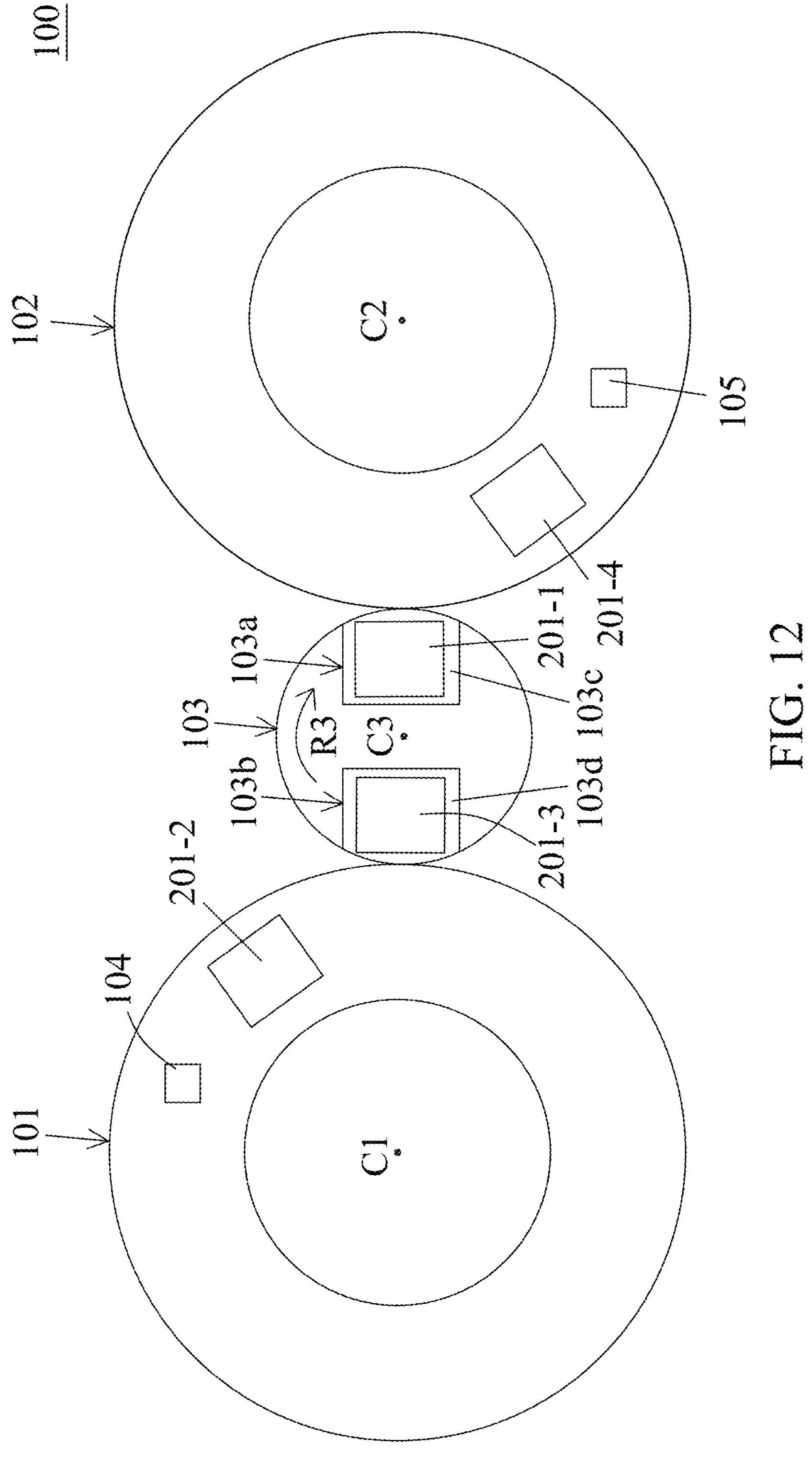

In some embodiments, the bridging mechanism 103 then continues the rotation, so that the first lower mold 201-1 is disposed adjacent to the second carrier 102 and the third lower mold 201-3 is disposed adjacent to the first carrier 101 as shown in FIG. 12. In some embodiments, the bridging mechanism 103 is rotated directly from a position as shown in FIG. 10 to a position as shown in FIG. 12, without stopping at a position as shown in FIG. 11. As shown in FIG. 12, after the rotation of the bridging mechanism 103, the first lower mold 201-1 is disposed adjacent to the second carrier 102, and the third lower mold 201-3 is disposed adjacent to the first carrier 101.

Figure 13:
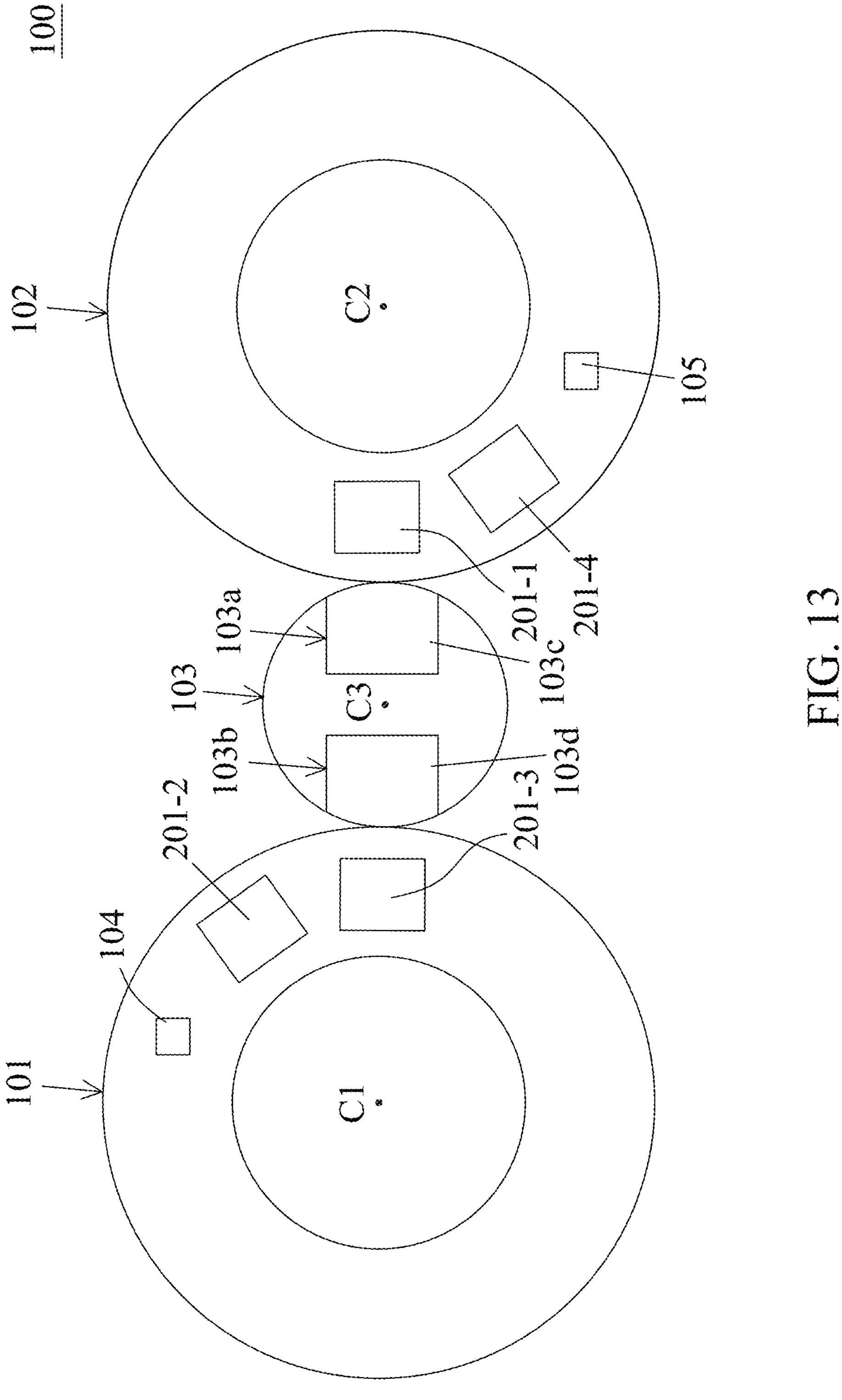

Next, the first lower mold 201-1 is moved from the bridging mechanism 103 into the second carrier 102, and the third lower mold 201-3 is moved from the bridging mechanism 103 into the first carrier 101, as shown in FIG. 13. In some embodiments, the first lower mold 201-1 is moved by the first conveying unit 103*a* to leave the first receiving space 103*c* and enter the second carrier 102, and the third lower mold 201-3 is moved by the second conveying unit 103*b* to leave the second receiving space 103*d* and enter the first carrier 101. As a result, the first lower mold 201-1 is conveyed from the first carrier 101 to the second carrier 102, and the third lower mold 201-3 is conveyed from the second carrier 102 to the first carrier 101. In other words, the bridging mechanism 103 is capable of exchanging the first lower mold 201-1 and the third lower mold 201-3 between the first carrier 101 and the second carrier 102.

Figure 15:
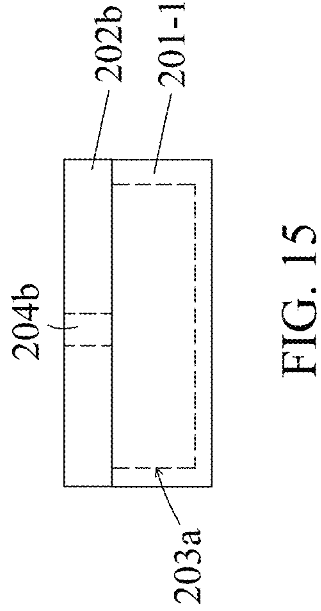
Figure 14:
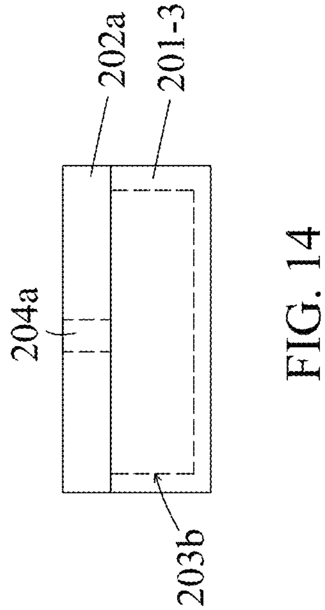

After moving the first lower mold 201-1 to the second carrier 102 and moving the third lower mold 201-3 to the first carrier 101, the corresponding one of first upper molds 202*a* is tightly engaged with the third lower mold 201-3 on the first carrier 101 as shown in FIG. 14, and the corresponding one of second upper molds 202*b* is tightly engaged with the first lower mold 201-1 on the second carrier 102 as shown in FIG. 15.

Figure 16:
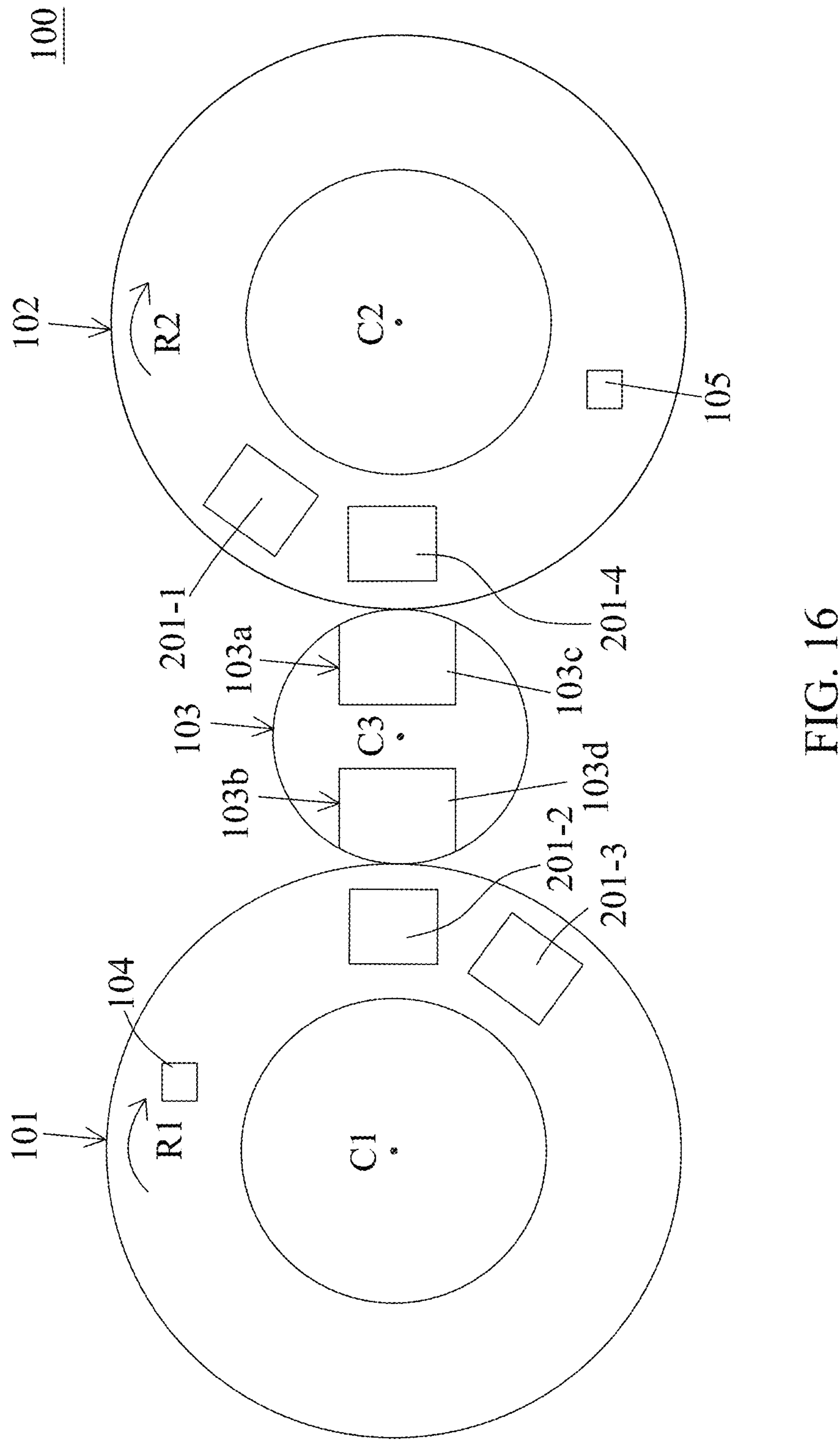

Next, the first carrier 101 and the second carrier 102 are rotated in the first direction R1 and the second direction R2, respectively, as shown in FIG. 16. In some embodiments, the first carrier 101 and the second carrier 102 are rotated at the predetermined interval. After the rotation, the first lower mold 201-1 and the corresponding one of the second upper molds 202*b* are disposed away from the bridging mechanism 103, and the third lower mold 201-3 and the corresponding one of the first upper molds 202*a* are also disposed away from the bridging mechanism 103.

In some embodiments, after the rotation, the second lower mold 201-2 and the corresponding one of first upper molds 202*a* are disposed adjacent to the second receiving space 103*d*, and the fourth lower mold 201-4 and the corresponding one of second upper molds 202*b* are disposed adjacent to the first receiving space 103*c*. In some embodiments, the second lower mold 201-2 is aligned with the second receiving space 103*d*, and the fourth lower mold 201-4 is aligned with the first receiving space 103*c*.

Figure 18:
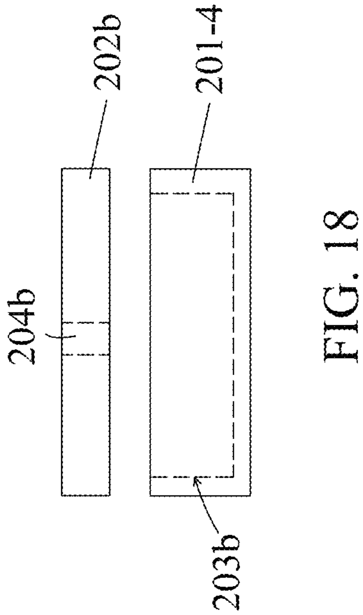
Figure 17:
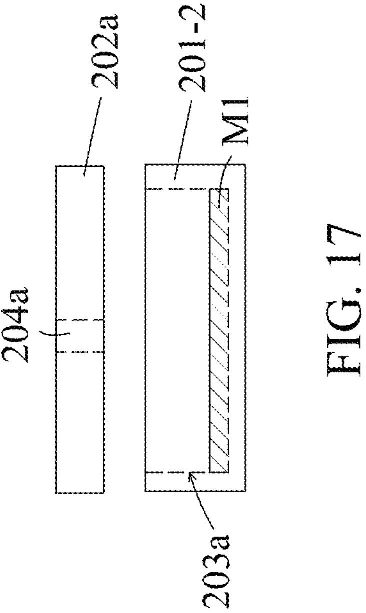

After the rotation of the first carrier 101, the second lower mold 201-2 is disengaged with the corresponding one of the first upper molds 202*a* as shown in FIG. 17. Similarly, after the rotation of the second carrier 102, the fourth lower mold 201-4 is disengaged with the corresponding one of the second upper molds 202*b* as shown in FIG. 18. That is, the second lower mold 201-2 is movable relative to the first carrier 101, and the fourth lower mold 201-4 is movable relative to the second carrier 102.

As described above and shown in FIG. 6, the first polymeric material M1 has been injected into the first mold cavity 203*a* by the first injector 104 (in the operation S306 of FIG. 4), and thus the first polymeric material M1 is disposed inside the disengaged second lower mold 201-2 of FIG. 17.

Referring back to FIG. 4, in the operation S308 of the injection molding method 300, the lower mold 201 carrying the first polymeric material M1 is moved to the bridging mechanism 103. Next, in the operation S310, the bridging mechanism 103 is rotated to convey the lower mold 201 carrying the first polymeric material M1 to the second carrier 102. Next, in the operation S312, the conveyed lower mold 201 is engaged with the one of the second upper mold 202*b*, so as to form the second mold cavity 203*b*.

Figure 19:
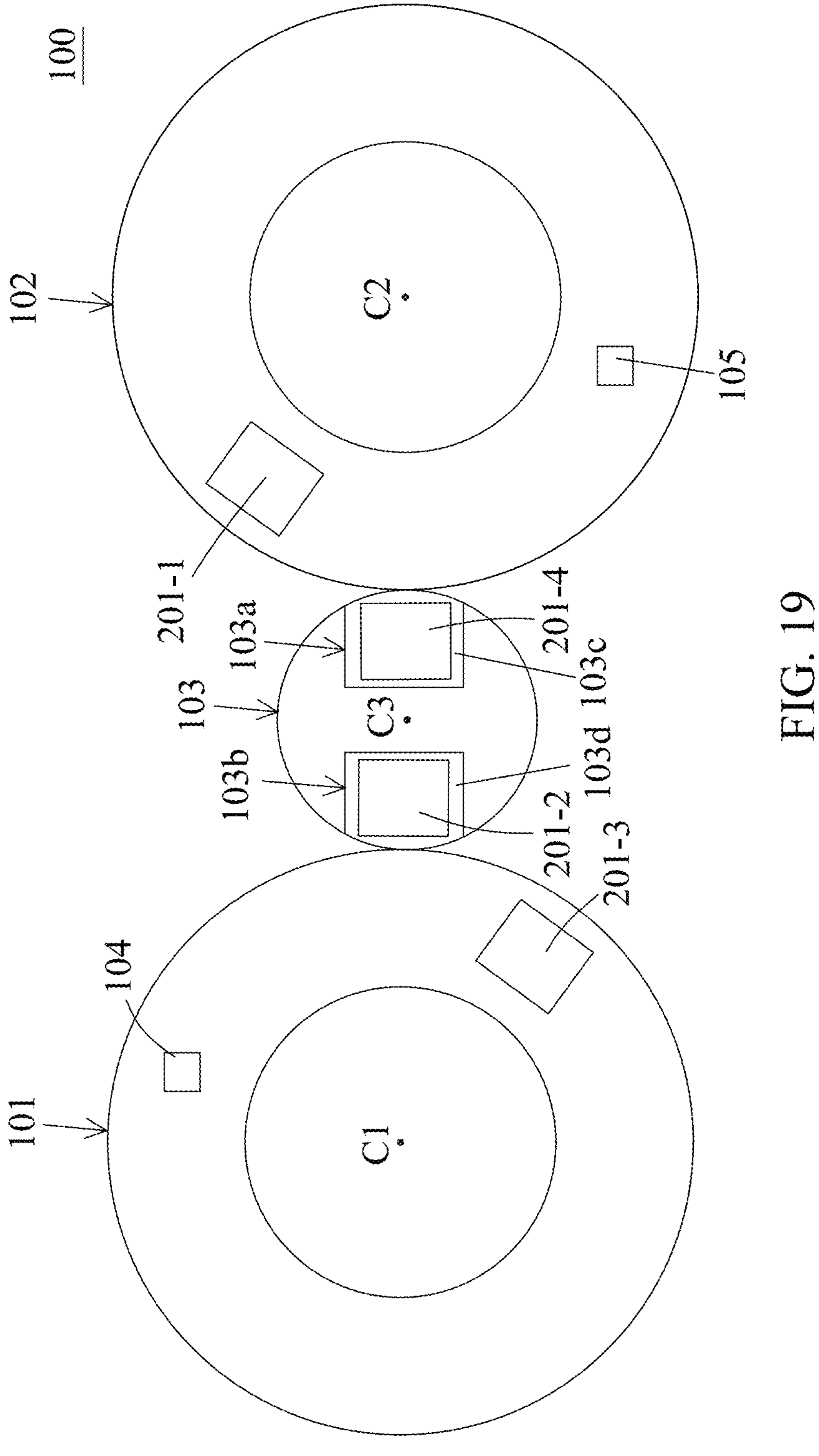
Figure 20:
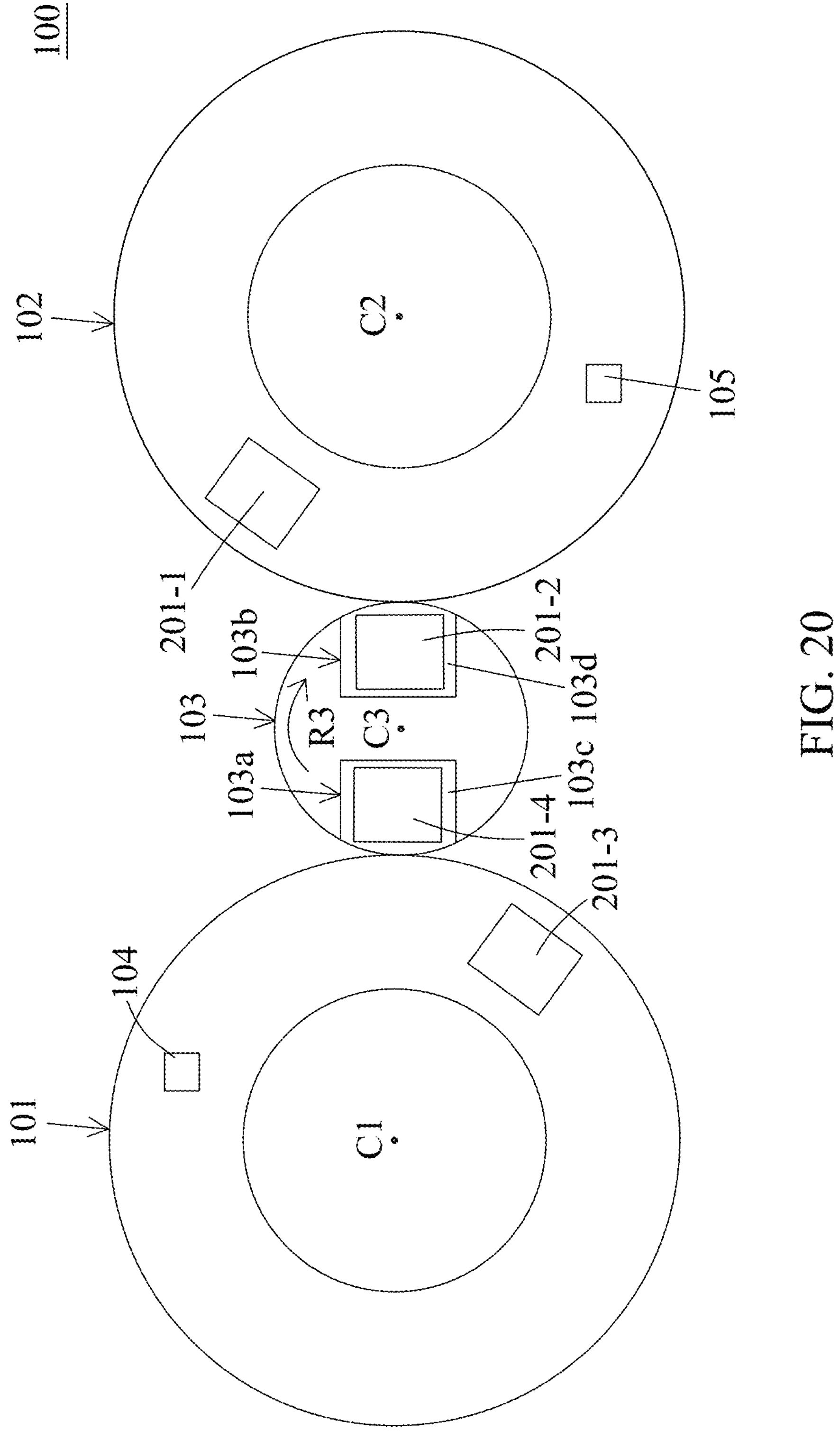
Figure 21:
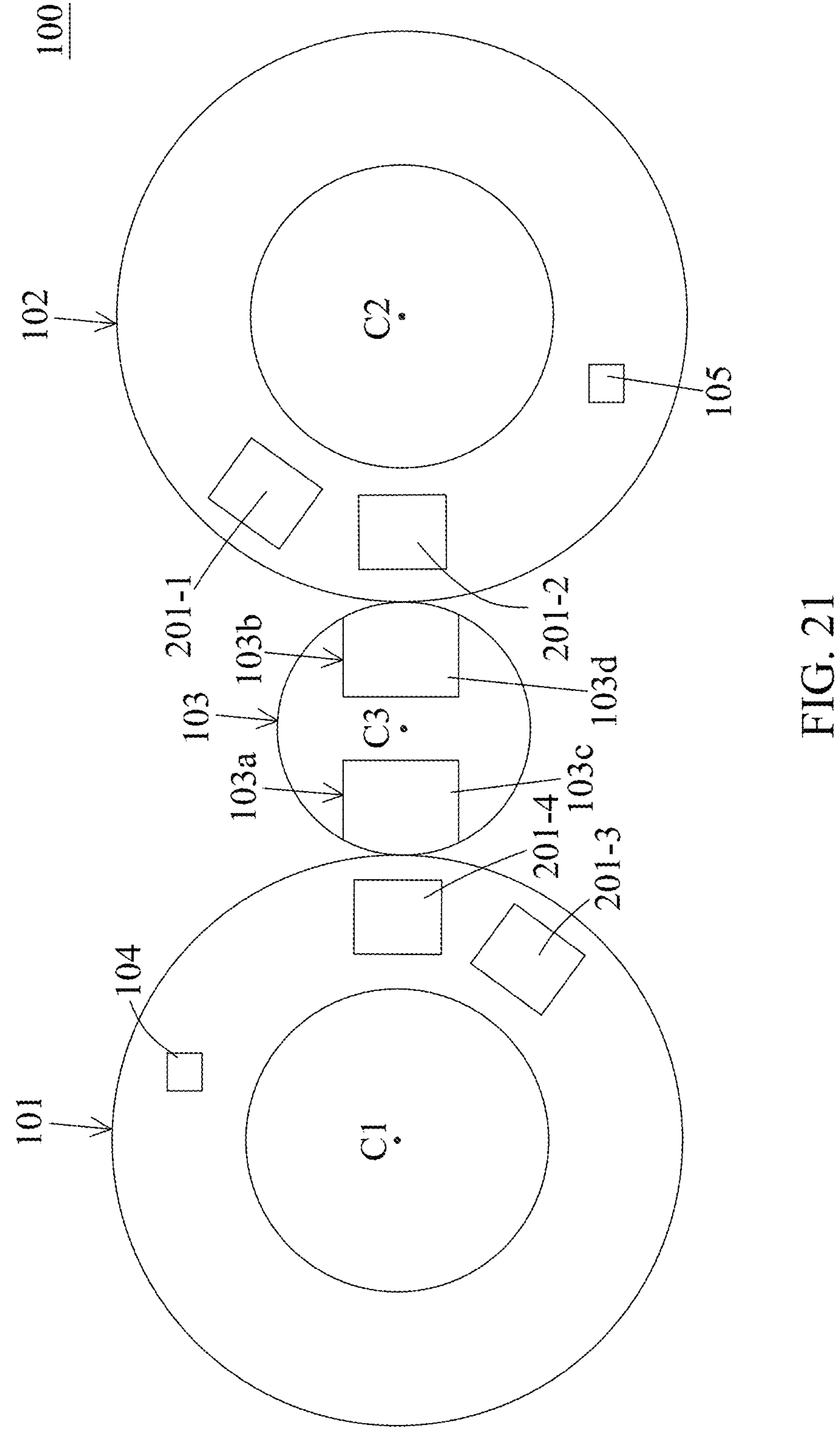
Figure 23:
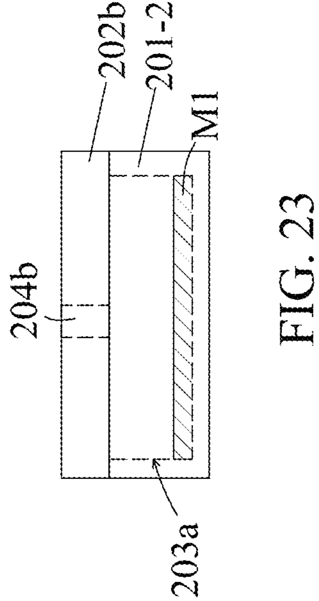

For example, as shown in FIG. 19, the second lower mold 201-2 carrying the first polymeric material M1 is moved from the first carrier 101 into the second receiving space 103*d* by the second conveying unit 103*b*, and the fourth lower mold 201-4 is moved from the second carrier 102 into the first receiving space 103*c* by the first conveying unit 103*a*. Next, the bridging mechanism 103 is rotated in the third direction R3 to convey the second lower mold 201-2 and the fourth lower mold 201-4, as shown in FIG. 20. In some embodiments, the first carrier 101 and the second carrier 102 stop rotation temporarily during the rotation of the bridging mechanism 103. In some embodiments, the bridging mechanism 103 is rotated so that the second lower mold 201-2 is disposed adjacent to the second carrier 102 and the fourth lower mold 201-4 is disposed adjacent to the first carrier 101. In some embodiments, the rotation of the bridging mechanism 103 is similar to the step as described above and shown in FIG. 12.

In some embodiments, the bridging mechanism 103 is rotated in the predetermined angle in a similar way as shown in FIG. 11 so that the second lower mold 201-2 is away from the first carrier 101 and the fourth lower mold 201-4 is away from the second carrier 102. After the rotation in the predetermined angle, the second lower mold 201-2 and the fourth lower mold 201-4 are processed by one or more additional processing units (not shown) configured at or over the bridging mechanism 103.

After the rotation of the bridging mechanism 103, the second lower mold 201-2 is moved from the bridging mechanism 103 into the second carrier 102, and the fourth lower mold 201-4 is moved from the bridging mechanism 103 into the first carrier 101. In some embodiments, the fourth lower mold 201-4 is moved by the first conveying unit 103*a* to leave the first receiving space 103*c* and enter the first carrier 101, and the second lower mold 201-2 is moved by the second conveying unit 103*b* to leave the second receiving space 103*d* and enter the second carrier 102. As a result, the second lower mold 201-2 is conveyed from the first carrier 101 to the second carrier 102, and the fourth lower mold 201-4 is conveyed from the second carrier 102 to the first carrier 101. Thus, the second lower mold 201-2 carrying the first polymeric material M1 is moved to the second carrier 102 from the first carrier 101 through the bridging mechanism 103.

Figure 22:
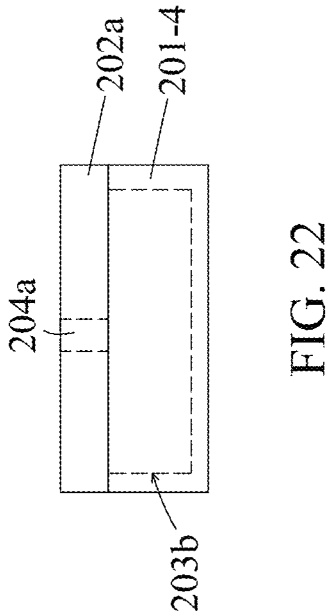
Figure 24:
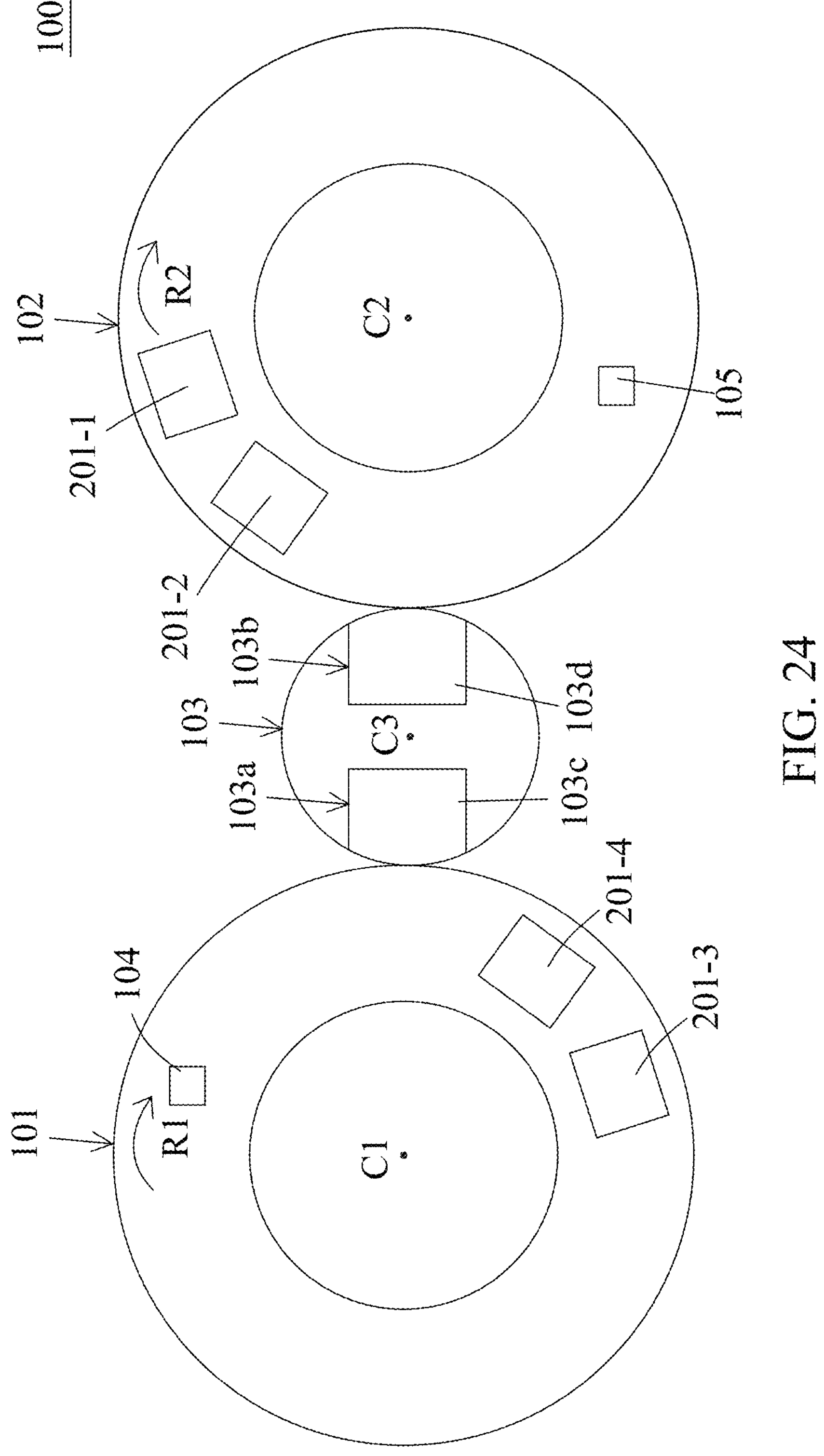

After moving the fourth lower mold 201-4 to the first carrier 101, the corresponding one of first upper molds 202*a* is tightly engaged with the fourth lower mold 201-4 on the first carrier 101, as shown in the closed configuration of FIG. 22. Similarly, after moving the second lower mold 201-2 to the second carrier 102, the corresponding one of second upper molds 202*b* is tightly engaged with the second lower mold 201-2 on the second carrier 102 as shown in the closed configuration of FIG. 23.

Next, the first carrier 101 and the second carrier 102 are rotated in the first direction R1 and the second direction R2, respectively. In some embodiments, the first carrier 101 and the second carrier 102 are rotated at the predetermined interval. After the rotation, the second lower mold 201-2 and the corresponding one of the second upper molds 202*b* are disposed away from the bridging mechanism 103, and the fourth lower mold 201-4 and the corresponding one of the first upper molds 202*a* are also disposed away from the bridging mechanism 103.

Figure 25:
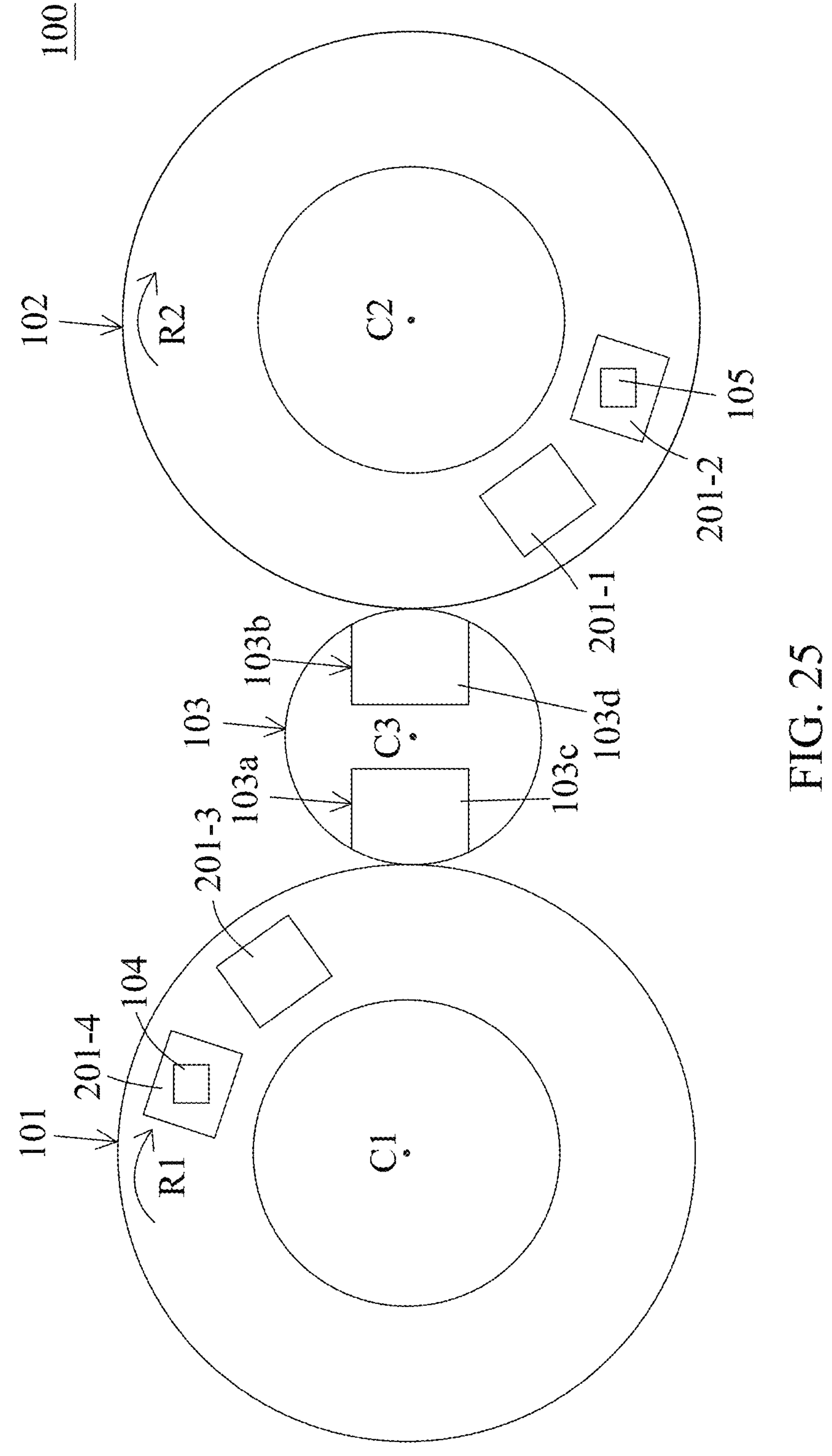
Figure 27:
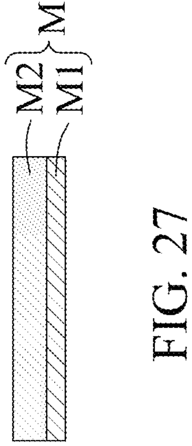

In some embodiments, the first carrier 101 is configured to continue to rotate in the first direction R1, so that the fourth lower mold 201-4 and the corresponding one of the first upper molds 202*a* are disposed under the first injector 104, as shown in FIG. 25. Similarly, the second carrier 102 is configured to continue to rotate in the second direction R2, so that the second lower mold 201-2 and the corresponding one of second upper molds 202*b* are disposed under the second injector 105.

Referring back to FIG. 4, in the operation S314 of the injection molding method 300, after the lower mold 201 carrying the first polymeric material M1 is rotated under the second injector 105, the second polymeric material M2 is injected into the second mold cavity 203*b* by the second injector 105. Therefore, in the operation S316, an article including the first polymeric material M1 and the second polymeric material M2 is obtained.

Figure 26:
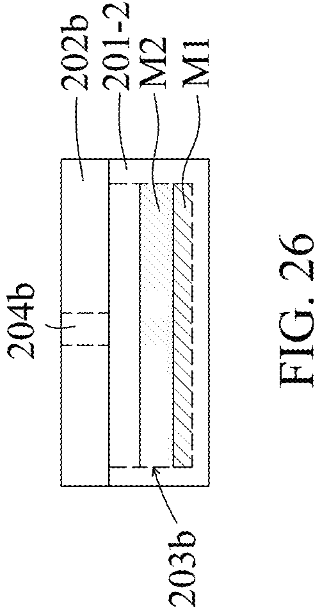

For example, after the second lower mold 201-2 and the corresponding one of second upper molds 202*b* are rotated under the second injector 105 by the second carrier 102, the second polymeric material M2 is injected from the second injector 105 into the second molding station 200*b* under the second injector 105 as shown in FIG. 26. The second polymeric material M2 is injected into the second mold cavity 203*b* through the second sprue 204*b*. As described above, the second mold cavity 203*b* is defined by the second upper mold 202*b* and the corresponding lower mold 201 when the second molding station 200*b* is in the closed configuration. In some embodiments, the second polymeric material M2 includes thermoplastic polyurethane (TPU), polyurethane (PU), plastics or any other suitable materials. In some embodiments, the second polymeric material M2 includes a physical blowing agent such as supercritical fluid. In some embodiments, the physical blowing agent is gaseous nitrogen, carbon dioxide, etc. In some embodiments, the second polymeric material M2 is foamable, non-foamable or slightly foamable.

The first polymeric material M1 is different from the second polymeric material M2. In some embodiments, the first polymeric material M1 and the second polymeric material M2 have different materials, different physical properties, etc. In some embodiments, the first polymeric material M1 and the second polymeric material M2 have different densities, hardnesses and so on.

After injecting the second polymeric material M2 into the first mold cavity 203, the second carrier 102 is rotated in the second direction R2 such that the second lower mold 201-2 and the corresponding one of second upper molds 202*b* are moved away from the second injector 105. After moving the second lower mold 201-2 and the corresponding one of second upper molds 202*b* away from the second injector 105, the corresponding one of second upper molds 202*b* is disengaged with the second lower mold 201-2 so that an article M including the first polymeric material M1 and the second polymeric material M2 can be taken out from the second lower mold 201-2. In some embodiments, the article M is a part of a footwear (such as outsole, insole, midsole, etc.) or any other products.

Figure 28:
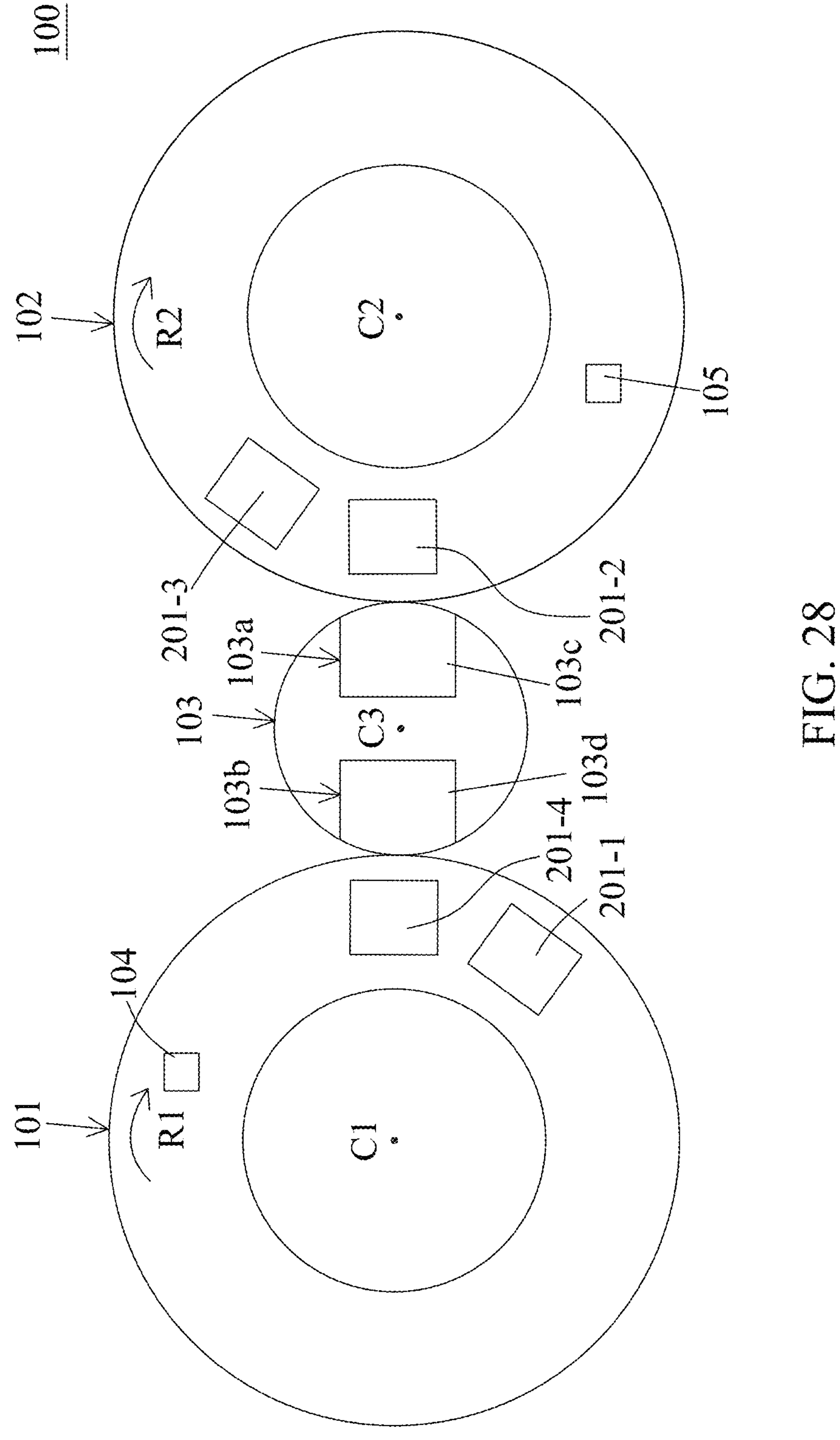
Figure 29:
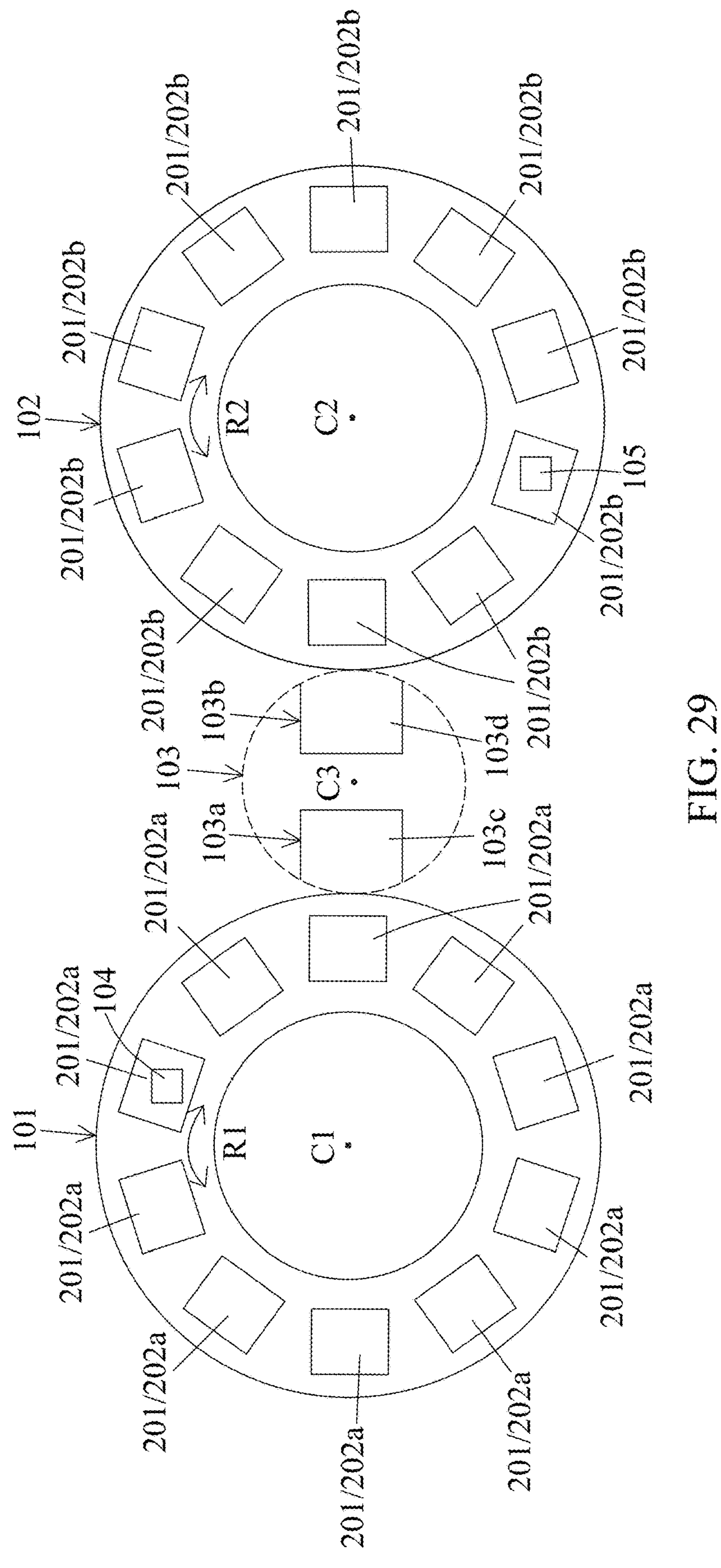

After the article M is taken out from the second lower mold 201-2, the first carrier 101 and the second carrier 102 continue to rotate, as described above. After the rotation, the first lower mold 201-1 and the third lower mold 201-3 have been exchanged by the bridging mechanism 103, as shown in FIG. 28. The first lower mold 201-1 is an empty mold from which the article M has be taken out, and the third lower mold 201-3 is the lower mold carrying the first polymeric material M1 injected by the first injector 104. Furthermore, in order to convey the second lower mold 201-2 and the fourth mold 201-4 through the bridging mechanism 103, the second lower mold 201-2 and the corresponding one of the second upper molds 202*b* are disposed adjacent to the first receiving space 103*c* of the bridging mechanism 103, and the fourth mold 201-4 and the corresponding one of the first upper molds 202*a* are disposed adjacent to the second receiving space 103*d* of the bridging mechanism 103.

In some embodiments, the bridging mechanism 103 (as shown in broken lines in FIG. 29) can be idle, stopped, in not-in-use state, or even disconnected or removed from the injection molding system 100, while the first carrier 101 and the second carrier 102 are operated individually and perform those relevant steps of the injection molding method as described above independently. The rotation of the first carrier 101 is independent from the rotation of the second carrier 102.

Figure 30:
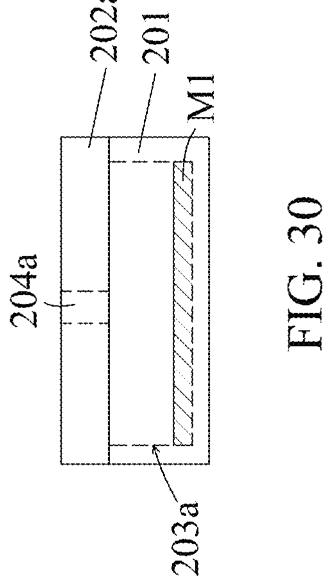

In some embodiments, when the bridging mechanism 103 is in not-in-use state or removed, the first upper molds 202*a* and the lower molds 201 on the first carrier 101 are moved by the rotation of the first carrier 101. When the first upper mold 202*a* and the corresponding lower mold 201 are conveyed and then disposed under the first injector 104, the first polymeric material M1 is injected from the first injector 104 into the first mold cavity 203*a* through the first sprue 204*a* as shown in FIG. 30. After the injection of the first polymeric material M1, the first upper mold 202*a* and the corresponding lower mold 201 are moved away from the first injector 104 by the rotation of the first carrier 101. After moving away from the first injector 104, the first upper mold 202*a* is disengaged from the corresponding lower mold 201, so that an article having the first polymeric material M1 is formed inside the corresponding lower mold 201 and can be taken out from the corresponding lower mold 201.

Figure 31:
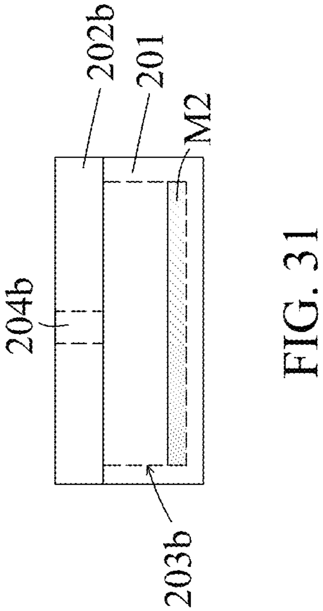

Similarly, when the bridging mechanism 103 is in not-in-use state or removed, the second upper molds 202*b* and the lower molds 201 on the second carrier 102 are moved by the rotation of the second carrier 102. When the second upper mold 202*b* and the corresponding lower mold 201 are conveyed and then disposed under the second injector 105, the second polymeric material M2 is injected from the second injector 105 into the second mold cavity 203*b* through the second sprue 204*b* as shown in FIG. 31. After the injection of the second polymeric material M2, the second upper mold 202*b* and the corresponding lower mold 201 are moved away from the second injector 105 by the rotation of the second carrier 102. After moving away from the second injector 105, the second upper mold 202*b* is disengaged from the corresponding lower mold 201, so that an article having the second polymeric material M2 is formed inside the corresponding lower mold 201 and can be taken out from the corresponding lower mold 201.

When the bridging mechanism 103 is in not-in-use state or removed, the first polymeric material M1 and the second polymeric material M2 are same or different materials. In some embodiments, the first polymeric material M1 and the second polymeric material M2 have same or different physical properties.

In some embodiments, the injection molding system 100 is controlled by a controller (not shown). The controller is configured to control the rotation of the first carrier 101, the rotation of the second carrier 102, and the rotation of the bridging mechanism 103, e.g., the direction, angle and speed during the rotation, so as to form an article including more than one portion having different physical or functional properties. Furthermore, the controller is configured to idle or stop the bridging mechanism 103, so as to form an article including single physical or functional property.

According to the embodiments of the present disclosure, the bridging mechanism 103 is used to convey the lower molds between the first carrier 101 and the second carrier 102 by rotation or movement of the bridging mechanism 103. Through the bridging mechanism 103, the two different injections of the first injector 104 and the second injector 105 are performed continuously on the first carrier 101 and the second carrier 102, thereby decreasing manufacturing time of the article including more than one portion having different physical or functional properties.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding system, comprising:

a first carrier configured to hold a first mold;

a first injector disposed over the first carrier and configured to inject a first polymeric material;

a second carrier configured to hold a second mold;

a second injector disposed over the second carrier and configured to inject a second polymeric material; and a bridging mechanism disposed between and moveable relative to the first carrier and the second carrier, and configured to receive a third mold from the first carrier or the second carrier and convey the third mold between the first carrier and the second carrier, wherein the first carrier is rotatable relative to the bridging mechanism, and the first mold is movable closer to or farther away from the bridging mechanism by the first carrier.

2. The injection molding system of claim 1, wherein the first and second polymeric materials are foamable, non-foamable or slightly foamable materials.

3. The injection molding system of claim 1, wherein the third mold disposed adjacent to the first mold is conveyable from the first carrier to the second carrier to dispose the third mold adjacent to the second mold, or the third mold disposed adjacent to the second mold is conveyable from the second carrier to the first carrier to dispose the third mold adjacent to the first mold.

4. The injection molding system of claim 1, wherein the first mold is fixedly attached to the first carrier, and the second mold is fixedly attached to the second carrier.

5. The injection molding system of claim 1, wherein a first mold cavity is defined by the first mold and the third mold and a second mold cavity is defined by the second mold and the third mold, wherein the first polymeric material is injected into the first mold cavity by the first injector, and the second polymeric material is injected into the second mold cavity by the second injector.

6. The injection molding system of claim 5, wherein the first mold includes a first sprue configured to receive the first polymeric material from the first injector and communicable with the first mold cavity, and the second mold includes a second sprue configured to receive the second polymeric material from the second injector and communicable with the second mold cavity.

7. The injection molding system of claim 1, wherein the bridging mechanism comprises:

a first conveying unit configured to convey the third mold from the first carrier to a first receiving space of the bridging mechanism; and a second conveying unit configured to convey the third mold from the second carrier to a second receiving space of the bridging mechanism.

8. The injection molding system of claim 7, wherein the first and second receiving spaces are disposed at opposite sides of the bridging mechanism.

9. The injection molding system of claim 8, wherein each of the first and second conveying units is a rail or belt.

10. The injection molding system of claim 1, wherein second carrier is rotatable relative to the bridging mechanism, and the second mold is movable closer to or farther away from the bridging mechanism by the second carrier.

11. The injection molding system of claim 10, wherein a first rotation center of the first carrier, a second rotation center of the second carrier and a third rotation center of the bridging mechanism are arranged on a straight line.

12. An injection molding system, comprising:

a first carrier configured to hold a first mold;

a first injector disposed over the first carrier and configured to inject a first polymeric material into a first mold cavity defined by the first mold and a third mold;

a second carrier configured to hold a second mold;

a second injector disposed over the second carrier and configured to inject a second polymeric material into a second mold cavity defined by the second mold and the third mold; and a bridging mechanism disposed between and moveable relative to the first carrier and the second carrier, and configured to convey the third mold with the first polymeric material from the first carrier to the second carrier or the third mold with the second polymeric material from the second carrier to the first carrier, wherein the first carrier and the second carrier are respectively rotatable relative to the bridging mechanism.

13. The injection molding system of claim 12, wherein the first polymeric material and the second polymeric material have the same physical properties.

14. The injection molding system of claim 12, wherein the first polymeric material and the second polymeric material have different physical properties.

15. The injection molding system of claim 12, wherein the first and second polymeric materials are foamable, non-foamable or slightly foamable materials.

16. The injection molding system of claim 12, wherein the first mold is fixedly attached to the first carrier, and the second mold is fixedly attached to the second carrier.

17. The injection molding system of claim 12, wherein the bridging mechanism comprises:

a first conveying unit configured to convey the third mold from the first carrier to a first receiving space of the bridging mechanism; and a second conveying unit configured to convey the third mold from the second carrier to a second receiving space of the bridging mechanism, wherein the first and second receiving spaces are disposed at opposite sides of the bridging mechanism.

18. The injection molding system of claim 17, wherein each of the first and second conveying units is a rail or belt.

19. The injection molding system of claim 12, wherein a first rotation center of the first carrier, a second rotation center of the second carrier and a third rotation center of the bridging mechanism are arranged on a straight line.

* * * * *